United States Patent
Gadodia et al.

(10) Patent No.: US 10,657,134 B2
(45) Date of Patent: May 19, 2020

(54) SELECTING QUERIES FOR EXECUTION ON A STREAM OF REAL-TIME DATA

(71) Applicant: Ab Initio Technology LLC, Lexington, MA (US)

(72) Inventors: Rajesh Gadodia, Singapore (SG); Joseph Skeffington Wholey, III, Belmont, MA (US)

(73) Assignee: Ab Initio Technology LLC, Lexington, MA (US)

( * ) Notice: Subject to any disclaimer, the term of this patent is extended or adjusted under 35 U.S.C. 154(b) by 200 days.

(21) Appl. No.: 14/818,895

(22) Filed: Aug. 5, 2015

(65) Prior Publication Data

US 2017/0039245 A1 Feb. 9, 2017

(51) Int. Cl.
*G06F 16/30* (2019.01)
*G06F 16/2455* (2019.01)
(Continued)

(52) U.S. Cl.
CPC .... *G06F 16/24568* (2019.01); *G06F 16/2428* (2019.01); *G06F 16/9024* (2019.01)

(58) Field of Classification Search
CPC .......... G06F 16/9535; G06F 16/24568; G06F 16/2428; G06F 16/9024
(Continued)

(56) References Cited

U.S. PATENT DOCUMENTS 3,662,343 A 5/1972 Goldstein et al.
3,662,401 A 5/1972 Collins et al.
(Continued)

FOREIGN PATENT DOCUMENTS

AU 2014/262225 12/2014
CN 1965296 5/2007
(Continued)

OTHER PUBLICATIONS

"RASSP Data Flow Graph Design Application Note." International Conference on Parallel Processing, Dec. 2000, Retrieved from Internet <http://www.atl.external.lmco.com/projects/rassp/RASSP_legacy/appnotes/FLOW/APNOTE_FLOW_02>, 5 pages.
(Continued)

*Primary Examiner* — Sana A Al-Hashemi

(74) *Attorney, Agent, or Firm* — Fish & Richardson P.C.

(57) ABSTRACT

A computer-implemented method for executing a query on data items located at different places in a stream of near real-time data to provide near-real time intermediate results for the query, as the query is being executed, the method including: from time to time, executing, by one or more computer systems, the query on two or more of the data items located at different places in the stream, with the two or more data items being accessed in near real-time with respect to each of the two or more data items; generating information indicative of results of executing the query; and as the query continues being executed, generating intermediate results of query execution by aggregating the results with prior results of executing the query on data items that previously appeared in the stream of near real-time data; and transmitting to one or more client devices the intermediate results of query execution, prior to completion of execution of the query.

22 Claims, 10 Drawing Sheets

(51) Int. Cl.
*G06F 16/242* (2019.01)
*G06F 16/901* (2019.01)

(58) Field of Classification Search
USPC ........ 707/607, 609, 687, 705, 790, 813, 821
See application file for complete search history.

(56) References Cited

U.S. PATENT DOCUMENTS

| | | | |
|---|---|---|---|
| 4,228,496 A | 10/1980 | Katzman et al. | |
| 4,922,418 A | 5/1990 | Dolecek | |
| 4,972,314 A | 11/1990 | Getzinger et al. | |
| 5,050,068 A | 9/1991 | Dollas | |
| 5,127,104 A | 6/1992 | Dennis | |
| 5,276,899 A | 1/1994 | Neches | |
| 5,280,619 A | 1/1994 | Wang | |
| 5,301,336 A | 4/1994 | Kodosky | |
| 5,323,452 A | 6/1994 | Dickman et al. | |
| 5,333,319 A | 7/1994 | Silen | |
| 5,357,632 A | 10/1994 | Pian et al. | |
| 5,495,590 A | 2/1996 | Comfort et al. | |
| 5,504,900 A | 4/1996 | Raz | |
| 5,630,047 A | 5/1997 | Wang | |
| 5,692,168 A | 11/1997 | McMahan | |
| 5,701,400 A | 12/1997 | Amardo | |
| 5,712,971 A | 1/1998 | Stanfill et al. | |
| 5,745,778 A | 4/1998 | Alfieri | |
| 5,799,266 A | 8/1998 | Hayes | |
| 5,802,267 A | 9/1998 | Shirakihara et al. | |
| 5,805,462 A | 9/1998 | Poirot et al. | |
| 5,857,204 A | 1/1999 | Lordi et al. | |
| 5,899,988 A * | 5/1999 | Depledge | G06F 16/22 |
| 5,923,832 A | 7/1999 | Shirakihara et al. | |
| 5,924,095 A | 7/1999 | White | |
| 5,930,794 A | 7/1999 | Linenbach et al. | |
| 5,933,640 A | 8/1999 | Dion | |
| 5,950,212 A | 9/1999 | Anderson et al. | |
| 5,966,072 A | 10/1999 | Stanfill et al. | |
| 5,999,729 A | 12/1999 | Tabloski, Jr. et al. | |
| 6,006,242 A | 12/1999 | Poole et al. | |
| 6,012,094 A | 1/2000 | Leyman | |
| 6,014,670 A | 1/2000 | Zamanian et al. | |
| 6,016,516 A | 1/2000 | Horikiri | |
| 6,032,158 A | 2/2000 | Mukhopadhhyay et al. | |
| 6,038,558 A | 3/2000 | Powers et al. | |
| 6,044,211 A | 3/2000 | Jain | |
| 6,044,374 A | 3/2000 | Nesamoney et al. | |
| 6,044,394 A | 3/2000 | Cadden et al. | |
| 6,088,716 A | 7/2000 | Stanfill et al. | |
| 6,145,017 A | 11/2000 | Ghaffari | |
| 6,173,276 B1 | 1/2001 | Kant et al. | |
| 6,208,345 B1 | 3/2001 | Sheard et al. | |
| 6,256,637 B1 | 7/2001 | Venkatesh et al. | |
| 6,259,988 B1 | 7/2001 | Galkowski et al. | |
| 6,272,650 B1 | 8/2001 | Meyer et al. | |
| 6,301,601 B1 | 10/2001 | Helland | |
| 6,314,114 B1 | 11/2001 | Coyle et al. | |
| 6,324,437 B1 | 11/2001 | Frankel et al. | |
| 6,330,008 B1 | 12/2001 | Razdow et al. | |
| 6,332,212 B1 | 12/2001 | Organ et al. | |
| 6,339,775 B1 | 1/2002 | Zamanian et al. | |
| 6,400,996 B1 | 6/2002 | Hoffberg et al. | |
| 6,401,216 B1 | 6/2002 | Meth et al. | |
| 6,437,796 B2 | 8/2002 | Sowizral et al. | |
| 6,449,711 B1 | 9/2002 | Week | |
| 6,480,876 B2 | 11/2002 | Rehg et al. | |
| 6,496,961 B2 | 12/2002 | Gupta et al. | |
| 6,538,651 B1 | 3/2003 | Hayman et al. | |
| 6,584,581 B1 | 6/2003 | Bay et al. | |
| 6,608,628 B1 | 8/2003 | Ross et al. | |
| 6,611,862 B2 | 8/2003 | Reisman | |
| 6,640,244 B1 * | 10/2003 | Bowman-Amuah | G06F 9/466 707/999.01 |
| 6,651,234 B2 | 11/2003 | Gupta et al. | |
| 6,654,907 B2 | 11/2003 | Stanfill et al. | |
| 6,658,464 B2 | 12/2003 | Reisman | |
| 6,715,145 B1 | 3/2004 | Bowman-Amuah | |
| 6,728,879 B1 | 4/2004 | Atkinson | |
| 6,760,903 B1 | 7/2004 | Morshed et al. | |
| 6,813,761 B1 | 11/2004 | Das et al. | |
| 6,816,825 B1 | 11/2004 | Ashar et al. | |
| 6,832,369 B1 | 12/2004 | Kryka et al. | |
| 6,848,100 B1 | 1/2005 | Wu et al. | |
| 6,879,946 B2 | 4/2005 | Rong et al. | |
| 6,975,628 B2 | 12/2005 | Johnson | |
| 7,062,483 B2 | 6/2006 | Ferrari et al. | |
| 7,082,604 B2 | 7/2006 | Schneiderman | |
| 7,085,426 B2 | 8/2006 | August | |
| 7,103,597 B2 | 9/2006 | McGovern | |
| 7,103,620 B2 | 9/2006 | Kunz et al. | |
| 7,130,484 B2 | 10/2006 | August | |
| 7,137,116 B2 | 11/2006 | Parkes et al. | |
| 7,164,422 B1 | 1/2007 | Wholey et al. | |
| 7,165,030 B2 | 1/2007 | Yi et al. | |
| 7,167,850 B2 | 1/2007 | Stanfill | |
| 7,316,001 B2 | 1/2008 | Gold et al. | |
| 7,356,819 B1 | 4/2008 | Ricart et al. | |
| 7,398,514 B2 | 7/2008 | Ulrich et al. | |
| 7,412,658 B2 | 8/2008 | Gilboa | |
| 7,417,645 B2 | 8/2008 | Beda et al. | |
| 7,457,984 B2 | 11/2008 | Kutan | |
| 7,467,383 B2 | 12/2008 | Inchingolo et al. | |
| 7,505,975 B2 | 3/2009 | Luo | |
| 7,577,628 B2 | 8/2009 | Stanfill | |
| 7,594,220 B2 | 9/2009 | Kodosky et al. | |
| 7,636,699 B2 | 12/2009 | Stanfill | |
| 7,716,630 B2 | 5/2010 | Wholey et al. | |
| 7,756,940 B2 | 7/2010 | Sagawa | |
| 7,840,949 B2 | 11/2010 | Schumacher et al. | |
| 7,870,556 B2 | 1/2011 | Wholey et al. | |
| 7,877,350 B2 | 1/2011 | Stanfill et al. | |
| 7,979,479 B2 | 7/2011 | Staebler et al. | |
| 8,281,297 B2 | 10/2012 | Dasu et al. | |
| 8,286,176 B1 | 10/2012 | Baumback et al. | |
| 8,396,886 B1 | 3/2013 | Tsimelzon et al. | |
| 8,566,641 B2 | 10/2013 | Douros et al. | |
| 9,274,926 B2 | 3/2016 | Larson et al. | |
| 9,886,319 B2 | 2/2018 | Wakeling et al. | |
| 2001/0055019 A1 | 12/2001 | Sowizral et al. | |
| 2002/0080181 A1 | 6/2002 | Razdow et al. | |
| 2002/0087921 A1 | 7/2002 | Rodriguez | |
| 2002/0091747 A1 | 7/2002 | Rehg et al. | |
| 2002/0091748 A1 | 7/2002 | Rehg et al. | |
| 2002/0107743 A1 | 8/2002 | Sagawa | |
| 2002/0111876 A1 | 8/2002 | Rudraraju et al. | |
| 2002/0129340 A1 | 9/2002 | Tuttle | |
| 2002/0147745 A1 | 10/2002 | Houben et al. | |
| 2002/0184616 A1 | 12/2002 | Chessell et al. | |
| 2003/0004771 A1 | 1/2003 | Yaung | |
| 2003/0023413 A1 | 1/2003 | Srinivasa | |
| 2003/0033432 A1 | 2/2003 | Simpson et al. | |
| 2003/0091055 A1 | 5/2003 | Craddock et al. | |
| 2003/0126240 A1 | 7/2003 | Vosseler | |
| 2003/0204804 A1 | 10/2003 | Petri et al. | |
| 2004/0006745 A1 | 1/2004 | Van Heldan et al. | |
| 2004/0041838 A1 | 3/2004 | Adusumilli et al. | |
| 2004/0073529 A1 | 4/2004 | Stanfill | |
| 2004/0093559 A1 | 5/2004 | Amaru et al. | |
| 2004/0098452 A1 | 5/2004 | Brown et al. | |
| 2004/0107414 A1 | 6/2004 | Bronicki et al. | |
| 2004/0111469 A1 | 6/2004 | Manion et al. | |
| 2004/0148373 A1 | 7/2004 | Childress et al. | |
| 2004/0177099 A1 | 9/2004 | Ganesh et al. | |
| 2004/0205726 A1 | 10/2004 | Chedgey et al. | |
| 2004/0207665 A1 | 10/2004 | Mathur | |
| 2004/0210831 A1 | 10/2004 | Feng et al. | |
| 2004/0225657 A1 | 11/2004 | Sarkar | |
| 2004/0260590 A1 | 12/2004 | Golani et al. | |
| 2005/0021689 A1 | 1/2005 | Marvin et al. | |
| 2005/0033720 A1 | 2/2005 | Verma et al. | |
| 2005/0034112 A1 | 2/2005 | Stanfill | |
| 2005/0039176 A1 | 2/2005 | Fournie | |
| 2005/0059046 A1 | 3/2005 | Labrenz et al. | |
| 2005/0086360 A1 | 4/2005 | Mamou et al. | |
| 2005/0087743 A1 | 4/2005 | Mamou et al. | |

(56) References Cited

U.S. PATENT DOCUMENTS

| | | |
|---|---|---|
| 2005/0097515 A1 | 5/2005 | Ribling |
| 2005/0097561 A1 | 5/2005 | Schumacher et al. |
| 2005/0102325 A1 | 5/2005 | Gould et al. |
| 2005/0102670 A1 | 5/2005 | Bretl et al. |
| 2005/0114778 A1 | 5/2005 | Branson et al. |
| 2005/0144277 A1 | 6/2005 | Flurry et al. |
| 2005/0144596 A1 | 6/2005 | McCullough et al. |
| 2005/0149935 A1 | 7/2005 | Benedetti |
| 2005/0172268 A1 | 8/2005 | Kuturiano et al. |
| 2005/0177531 A1 | 8/2005 | Bracewell |
| 2005/0193056 A1 | 9/2005 | Schaefer et al. |
| 2005/0216421 A1 | 9/2005 | Barry et al. |
| 2005/0240621 A1 | 10/2005 | Robertson et al. |
| 2005/0262470 A1 | 11/2005 | Gavrilov |
| 2005/0289527 A1 | 12/2005 | Illowsky et al. |
| 2006/0047895 A1* | 3/2006 | Rowan ................ G06F 11/1474 711/112 |
| 2006/0085462 A1 | 4/2006 | Todd |
| 2006/0095722 A1 | 5/2006 | Biles et al. |
| 2006/0098017 A1 | 5/2006 | Tarditi et al. |
| 2006/0130041 A1 | 6/2006 | Pramanick et al. |
| 2006/0190105 A1 | 8/2006 | Hsu |
| 2006/0206872 A1 | 9/2006 | Krishnaswamy |
| 2006/0282474 A1 | 12/2006 | MacKinnon |
| 2006/0294150 A1 | 12/2006 | Stanfill et al. |
| 2006/0294459 A1 | 12/2006 | Davis et al. |
| 2007/0011668 A1 | 1/2007 | Wholey et al. |
| 2007/0022077 A1 | 1/2007 | Stanfill |
| 2007/0027138 A1 | 2/2007 | Jordis et al. |
| 2007/0035543 A1 | 2/2007 | David et al. |
| 2007/0094211 A1 | 4/2007 | Sun et al. |
| 2007/0118839 A1 | 5/2007 | Berstis et al. |
| 2007/0139441 A1 | 6/2007 | Lucas et al. |
| 2007/0143360 A1 | 6/2007 | Harris et al. |
| 2007/0150429 A1 | 6/2007 | Huelsman et al. |
| 2007/0174185 A1 | 7/2007 | McGovern |
| 2007/0179923 A1 | 8/2007 | Stanfill |
| 2007/0198971 A1 | 8/2007 | Dasu |
| 2007/0239766 A1 | 10/2007 | Papaefstathiou et al. |
| 2007/0271381 A1 | 11/2007 | Wholey et al. |
| 2007/0271562 A1 | 11/2007 | Schumacher et al. |
| 2007/0279494 A1 | 12/2007 | Aman et al. |
| 2007/0285440 A1 | 12/2007 | MacInnis et al. |
| 2008/0049022 A1 | 2/2008 | Sherb et al. |
| 2008/0126755 A1 | 5/2008 | Wu et al. |
| 2008/0134138 A1 | 6/2008 | Chamieh |
| 2008/0244524 A1 | 10/2008 | Kelso |
| 2008/0250049 A1 | 10/2008 | Chakra et al. |
| 2008/0288608 A1 | 11/2008 | Johnson |
| 2008/0288856 A1 | 11/2008 | Goranson |
| 2008/0294615 A1 | 11/2008 | Furuya et al. |
| 2009/0030863 A1 | 1/2009 | Stanfill et al. |
| 2009/0064147 A1 | 3/2009 | Beckerle et al. |
| 2009/0083313 A1 | 3/2009 | Stanfill et al. |
| 2009/0113196 A1 | 4/2009 | Jan et al. |
| 2009/0182728 A1 | 7/2009 | Anderson |
| 2009/0193391 A1 | 7/2009 | Miller et al. |
| 2009/0193417 A1 | 7/2009 | Kahlon |
| 2009/0224941 A1 | 9/2009 | Kansai et al. |
| 2009/0235267 A1 | 9/2009 | McKinney et al. |
| 2009/0245426 A1 | 10/2009 | Ratnaker et al. |
| 2009/0313625 A1 | 12/2009 | Sharoff |
| 2009/0327196 A1 | 12/2009 | Studer et al. |
| 2010/0042976 A1 | 2/2010 | Hines |
| 2010/0070955 A1 | 3/2010 | Kahlon |
| 2010/0169137 A1 | 7/2010 | Jastrebski et al. |
| 2010/0174694 A1 | 7/2010 | Staebler et al. |
| 2010/0180344 A1 | 7/2010 | Malyshev et al. |
| 2010/0211953 A1 | 8/2010 | Wakeling et al. |
| 2010/0218031 A1 | 8/2010 | Agarwal et al. |
| 2010/0281462 A1 | 11/2010 | Festa |
| 2010/0281488 A1 | 11/2010 | Krishnamurthy et al. |
| 2011/0078500 A1 | 3/2011 | Douros et al. |
| 2011/0093433 A1 | 4/2011 | Stanfill et al. |
| 2011/0154183 A1* | 6/2011 | Burns ................ H04L 65/40 715/234 |
| 2011/0307897 A1 | 12/2011 | Atterbury et al. |
| 2012/0023508 A1 | 1/2012 | Flores et al. |
| 2012/0036498 A1 | 2/2012 | Akirekadu et al. |
| 2012/0054255 A1 | 3/2012 | Buxbaum |
| 2012/0102029 A1 | 4/2012 | Larson et al. |
| 2012/0151419 A1 | 6/2012 | Kent et al. |
| 2012/0216176 A1 | 8/2012 | Gaikwad et al. |
| 2012/0222017 A1 | 8/2012 | Hinkle |
| 2012/0233599 A1 | 9/2012 | Valdiviezo Basauri et al. |
| 2012/0266074 A1 | 10/2012 | Bhoovaraghavan et al. |
| 2013/0124392 A1 | 5/2013 | Achanta |
| 2013/0167241 A1 | 6/2013 | Siman |
| 2013/0239089 A1 | 9/2013 | Eksten |
| 2013/0290928 A1 | 10/2013 | Johnson |
| 2014/0068566 A1 | 3/2014 | Coronado et al. |
| 2014/0143760 A1 | 5/2014 | Buxbaum |
| 2015/0160926 A1 | 6/2015 | Larson et al. |
| 2015/0160927 A1 | 6/2015 | Stevens et al. |

FOREIGN PATENT DOCUMENTS

| | | |
|---|---|---|
| CN | 101702942 | 5/2010 |
| EP | 0834810 | 4/1998 |
| EP | 3287896 | 2/2018 |
| JP | 64-013189 | 1/1989 |
| JP | H01-094431 | 4/1989 |
| JP | 06-236276 | 8/1994 |
| JP | H08-106540 | 4/1996 |
| JP | 08-278892 | 10/1996 |
| JP | 08-305576 | 11/1996 |
| JP | 63-231613 | 9/1998 |
| JP | 11-184766 | 7/1999 |
| JP | 2000-010788 | 1/2000 |
| JP | 2000-99317 | 4/2000 |
| JP | 2000-514219 | 10/2000 |
| JP | 2001-022571 | 1/2001 |
| JP | 2002-229943 | 8/2002 |
| JP | H05-134886 | 6/2005 |
| JP | 2005-317010 | 11/2005 |
| JP | 2006-504160 | 2/2006 |
| JP | 2006-133986 | 5/2006 |
| WO | WO 98/00791 | 1/1998 |
| WO | 2002/071344 | 2/2002 |
| WO | 2005/001687 | 1/2005 |
| WO | 2005/086906 | 9/2005 |
| WO | 2008/124319 | 10/2008 |
| WO | 2009/039352 | 3/2009 |
| WO | 2012/027560 | 3/2012 |
| WO | 2014/011708 | 1/2014 |

OTHER PUBLICATIONS

"Topological sorting," Wikipedia, accessed Dec. 10, 2012, 2 pages.

"Unicenter AutoSys Job Management," Computer Associates, Copyright 2001.

"Visual Lint: Squash Bugs Early with Interactive C/C++, C# and Java Code Analysis for Microsoft Visual Studio and Eclipse," [ retrieved from the internet Dec. 3, 2012: www.riverblade.co.uk/products/visual_lint.] (2 pages).

Babaoglu, O et al., "Mapping parallel computations onto distributed systems in Paralex" Compuero '91. Advanced Computer Technology, Reliable Systems and Applications. 5th Annual European Computer Conference. Proceedings. Bologna, Italy May 13-16, 1991, Los Alamitos, CA, USA, IEEE Comput. Soc, US, May 13, 1991, pp. 123-130.

Baer, J.L. et al., "Legality and Other Properties of Graph Models of Computations." Journal of the Association for Computing Machinery, vol. 17, No. 3, Jul. 1970, pp. 543-554.

Bernstein and Newcomer, "Principles of Transaction Processing, 2nd Edition", Morgan Kaufmann, XP002739946 (Jul. 24, 2009).

Bookstein, A. et al., "Modeling Word Occurrences for the Compression of Concordances." ACM Transactions on Information Systems, vol. 15, No. 3, Jul. 1997, pp. 254-290.

Burch, J.R. et al., "Sequential circuit verification using symbolic

(56) References Cited

OTHER PUBLICATIONS model checking." In Design Automation Conference, 1990, Proceedings of the 27$^{th}$ ACM/IEEE. Jun. 24-28, 1990, pp. 46-51.
Control-M; New Dimension Software. User Manual. New Dimension Software Ltd., 1999.
Cytron, Ron et al., "Efficiently Computing Static Single Assignment Form and the Control Dependence Graph." ACM Transactions on Programming Languages and Systems, vol. 13, No. 4, Oct. 1991, pp. 451-490.
De Pauw et al., "Web Services Navigator: visualizing the execution of Web Services," XP2477231, ISSN: 0018-8670, Jan. 1, 2005.
Dillon, Laura K., et al., "Inference Graphs: A Computational Structure Supporting Generation of Customizable and Correct Analysis Components," IEEE Transactions on Software Engineering, vol. 29, No. 2, Feb. 2003, pp. 133-150.
Ebert, Jurgen et al., "A Declarative Approach to Graph-Based Modeling." Workshop on Graph-Theoretic Concepts in Computer Science, 1994, pp. 1-19.
Evripidou, Paraskevas, et al., "Incorporating input/output operations into dynamic data-flow graphs," Parallel Computing 21 (1995) 1285-1311.
Frankl, Phyllis G., et al., "An Applicable Family of Data Flow Testing Criteria," IEEE Transactions on Sofrware Engineering, vol. 14, No. 10, Oct. 1988, pp. 1483-1498.
Gamma et al. "Design Patterns: Elements of Reusable Object-Oriented Software", Sep. 1999.
Grove et al., "A Framework for Call Graph Construction Algorithms." Nov. 2001, ACM Toplas, vol. 23, Issue 6, pp. 685-746.
Guyer et al., "Finding Your Cronies: Static Analysis for Dynamic Object Colocation." Oct. 2004, ACM, pp. 237-250.
Herniter, Marc E., "Schematic Capture with MicroSim PSpice," 2$^{nd}$ Edition, Prentice Hall, Upper Saddle River, N.J., 1996, pp. 51-52, 255-280, 292-297.
IBM: "Concepts and Architecture—Version 3.6," Internet citation, http://publibfp.boulder.ibm.com.epubs/pdf/h1262857, retrieved Apr. 19, 2007.
International Search Report & Written Opinion issued in PCT application No. PCT/US01/23552, dated Jan. 24, 2002, 5 pages.
International Search Report & Written Opinion issued in PCT application No. PCT/US06/24957, dated Jan. 17, 2008, 14 pages.
International Search Report & Written Opinion issued in PCT application No. PCT/US07/75576, dated Sep. 16, 2008, 13 pages.
International Search Report & Written Opinion issued in PCT application No. PCT/US08/71206, dated Oct. 22, 2008, 12 pages.
International Search Report & Written Opinion issued in PCT application No. PCT/US10/49966, dated Nov. 23, 2010, 8 pages.
International Search Report & Written Opinion received in PCT application No. PCT/US10/24036, dated Mar. 23, 2010, 11 pages.
International Search Report & Written Opinion received in PCT application No. PCT/US2011/040440, dated Oct. 12, 2011, 13 pages.
International Search Report & Written Opinion received in PCT application No. PCT/US2013/070386, dated Feb. 12, 2014, 7 pages.
International Search Report & Written Opinion received in PCT application No. PCT/US2013/076416, dated Apr. 9, 2014, 10 pages.
International Search Report and Written Opinion issued in PCT/US2016/045612, dated Jan. 13, 2017.
International Search Report and Written Opinion, PCT/US2014/068754, dated May 8, 2015 (17 pages).
Jawadi, Ramamohanrao et al., "A Graph-based Transaction Model for Active Databases and its Parallel Implementation." U. Florida Tech. Rep TR94-0003, 1994, pp. 1-29.
Just et al., "Review and Analysis of Synthetic Diversity for Breaking Monocultures." Oct. 2004, ACM, pp. 23-32.
Karasawa, K.; Iwata, M.; and Terada, H.—"Direct generation of data-driven program for stream-oriented processing"—Published in: Parallel Architctures and Compilation Techniques., 1997. Proceedings., 1997 International Conference on; Nov. 10-14, 1997 San Francisco, CA—Page(s):295-306.
Kebschull, U. et al., "Efficient Graph-Based Computation and Manipulation of Functional Decision Diagrams." University of Tubingen, 1993 IEEE, pp. 278-282.
Krahmer et al., "Graph-Based Generation of Referring Expressions." Mar. 2003, MIT Press, vol. 29, No. 1, pp. 53-72.
Krsul, Ivan et al., "VMPlants: Providing and Managing Virtual Machine Execution Environments for Grid Computing." Proceedings of the ACM/IEEE SC2004 Conference on Supercomputing, 2001, Nov. 6-12, 2004, 12 pages.
Li, Xiqing et al., "A Practical External Sort for Shared Disk MPPs." Proceedings of Supercomputing '93, 1993, 24 pages.
Martin, David et al., "Models of Computations and Systems—Evaluation of Vertex Probabilities in Graph Models of Computations." Journal of the Association for Computing Machinery, vol. 14, No. 2, Apr. 1967, pp. 281-299.
Mattson et al., "Patterns for Parallel Programming," Addison-Wesley Professional ISBN: 0-321-22811-1 (2004).
Ou, Chao-Wei et al., "Architecture-Independent Locality—Improving Transformations of Computational Graphs Embedded in k-Dimensions." Proceedings of the 9$^{th}$ International Conference on Supercomputing, 1995, pp. 289-298.
Rajesh K. Gupta and Giovanni de Micheli—"A co-synthesis approach to embedded system design automation" Design Automation for Embedded Systems, vol. 1, issue 1-2, 69-120.
Romberg, M., "Unicore: Beyond Web-based Job-Submission," Proceedings of the 42nd Cray User Group Conference, Noordwijk (May 22-26, 2000).
Russell, Nick, et al. "Workflow Control-Flow Patterns a Revised View," Workflow Patterns Initiative, 2006, pp. 1-134.
Shoten, Iwanami, "Encyclopedic Dictionary of Computer Science," (with English Translation), May 25, 1990, p. 741.
Stanfill, Craig et al., "Parallel Free-Text Search on the Connection Machine System." Communications of the ACM, vol. 29, No. 12, Dec. 1986, pp. 1229-1239.
Stanfill, Craig, "Massively Parallel Information Retrieval for Wide Area Information Servers." 1991 IEEE International Conference on Systems, Man and Cybernetics, Oct. 1991, pp. 679-682.
Stanfill, Craig, "The Marriage of Parallel Computing and Information Retrieval." IEE Colloquium on Parallel Techniques for Information Retrieval, Apr. 1989, 5 pages.
Vajracharya, Suvas et al., "Asynchronous Resource Management." Proceedings of the 15$^{th}$ International Parallel and Distributed Processing Symposium, Apr. 2001, 10 pages.
Van der Aalst, W.M.P., et al., "Workflow Patterns," Distributed and Parallel Databases, 14, 5-51, 2003.
Wah, B.W. et al., "Report on Workshop on High Performance Computing and Communications for Grand Challenge Applications: Computer Vision, Speech and Natural Language Processing, and Artificial Intelligence." IEEE Transactions on Knowledge and Data Engineering, vol. 5, No. 1, Feb. 1993, 138-154.
Whiting, Paul G., et al., "A History of Data-Flow Languages," IEEE Annals of the History of Computing, vol. 16, No. 4, 1994, pp. 38-59.
"Modular programming" Wikipedia, retrieved Feb. 10, 2009 (2 pages).
"System integration" Wikipedia, retrieved Jan. 25, 2009 (3 pages).
Fraleigh et al., "Integrating Dataflow and Sequential Control in a Graphical Diagnostic Language," IFAC, Symposium on On-line Fault Detection and Supervision in the Chemical Process Industries, Newark, Apr. 1992.
Finch et al., "Using the G2 Diagnostic Assistant for Real-Time Fault Diagnosis," Euopean Conference on Industrial Application of Knowledge-Based Diagnosis, Milan, Italy, Oct. 1991.
Stanley et al., "An Object-Oriented Graphical Language and Environment for Real-Time Fault Diagnosis," European Symposium on Computer Applications in Chemical Engineering, COPE-91, Spain, Oct. 1991.
"Performance Measurement Supporting Increase in Processing Speed of Java Program/Load Testing Tool," Java World, IDG Japan, Inc., Apr. 1, 2005 vol. 9, No. 4, pp. 020-021 (partial English Translation).

* cited by examiner

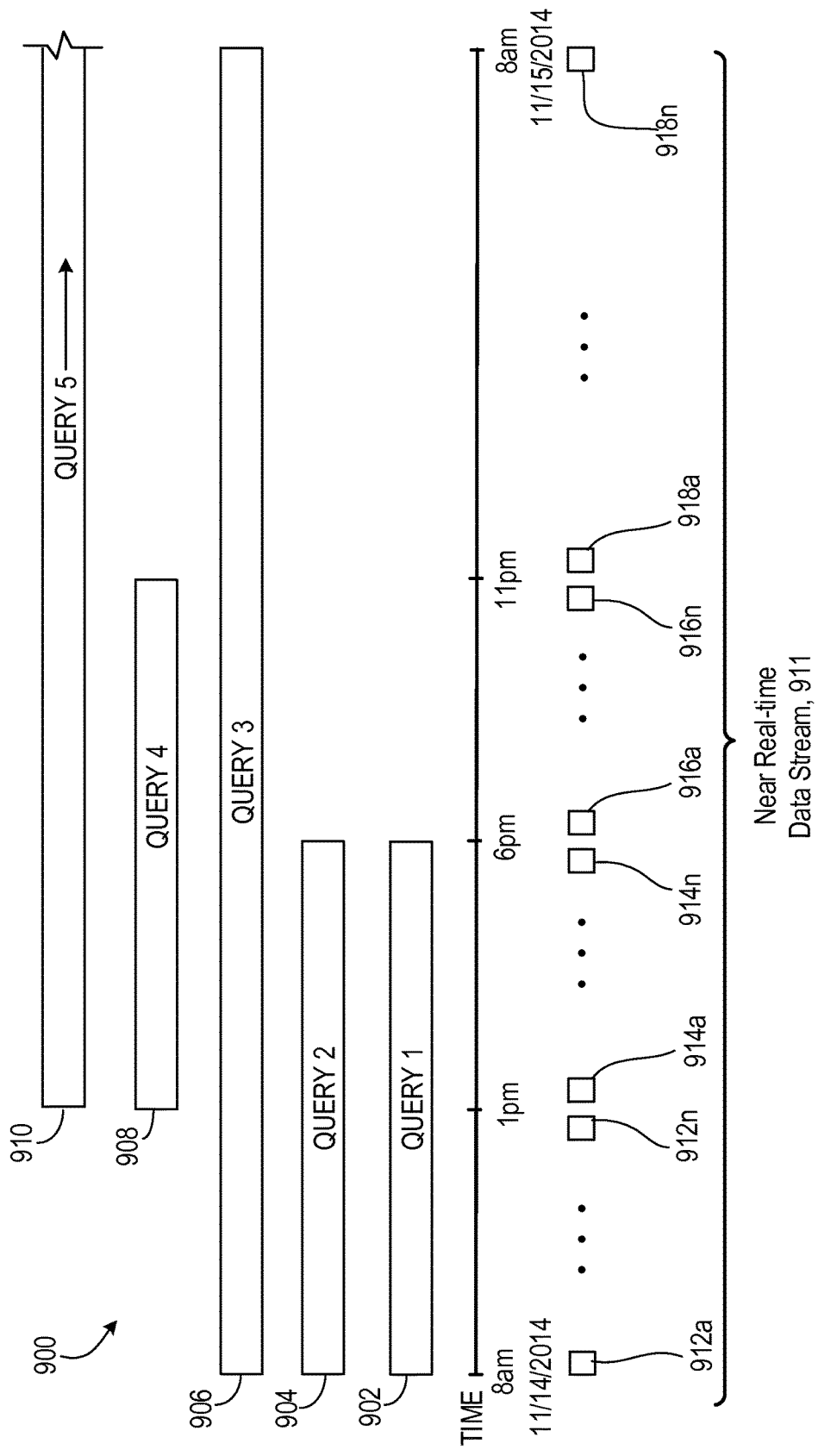

SELECTING QUERIES FOR EXECUTION ON A STREAM OF REAL-TIME DATA

BACKGROUND

Business systems require timely access to critical information for decision making. The traditional approach to meet such requirements has been to build data warehouses, data marts and reporting applications. These approaches have not been able to meet strict service level agreement (SLA) requirements for truly real-time applications, such as fraud detection, service monitoring, gaming and real-time trending, because these approaches are not able to monitor a stream of continuously arriving data, while searching for patterns or conditions.

Additionally, databases and Structured Query Language (SQL) do not have constructs to wait for data arrival. SQL works on historical data that is present in a repository, when the query is fired. This processing of historical data stored in a data warehouse often fails to meet many latency requirements, as it takes time to collect, cleanse and integrate data (commonly known as ETL—Extract Transform Load) in a data warehouse and as it also takes time to start a query for processing of the warehoused data.

SUMMARY

In an implementation, a computer-implemented method for executing a query on data items located at different places in a stream of near real-time data to provide near-real time intermediate results for the query, as the query is being executed, includes: from time to time, executing, by one or more computer systems, the query on two or more of the data items located at different places in the stream, with the two or more data items being accessed in near real-time with respect to each of the two or more data items; generating information indicative of results of executing the query; and as the query continues being executed, generating intermediate results of query execution by aggregating the results with prior results of executing the query on data items that previously appeared in the stream of near real-time data; and transmitting to one or more client devices the intermediate results of query execution, prior to completion of execution of the query. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The actions include, at a subsequent point in time, aggregating the intermediate results with results for executing the query at the subsequent point in time to generate final results. The actions also include storing the final results and discarding the intermediate results. Executing the query from time to time includes: executing the query on (i) one or more first data items in the stream of near real-time data, with the one or more first data items being located in a first portion of the stream, and (ii) one or more second data items in the stream of near real-time data, with the one or more second data items being located in a second portion of the stream. Executing the query includes: periodically executing a dataflow graph that represents the query, with the dataflow graph including executable computer code to implement the query, and with the dataflow graph receiving as input query specifications for the query. The dataflow graph includes components that represent operations to be performed in execution of the first query, and wherein the method further includes: for a component: performing a checkpoint operation that saves a local state of the component to enable recoverability of a state of the dataflow graph. The query is executed on data items that appear in the stream of near real-time data during a period of time the end of which is unknown at a start of executing the query. An amount of data items in the stream on which the query is executed is unknown at a start of executing the query.

The actions include accessing information indicative of user-defined custom operations for data transformation on the aggregated results; executing the user-defined custom operations on the aggregated results; and transforming the aggregated results in accordance with the user-defined custom operations. The actions include generating, based on the aggregated results, a near real-time alert to alert a user of detection of a pre-defined condition. The stream of near real-time data includes a data stream in which data items are (i) periodically received at different times, or (ii) continuously received at different times. The actions include receiving the stream of near real-time data from a data queue, a data repository, or a data feed. The query is a first query and wherein the method further includes: selecting a second query for execution on two or more of the data items that appear at different locations in the stream; and executing the first and second queries in near real-time with respect to the data items of the stream. The actions include generating information for a user interface that when rendered on a display device includes: input fields for input of information defining queries to be executed on the stream of near real-time data. The actions include accessing, in a control repository, pre-defined queries that are candidates for execution on the stream of near real-time data.

All or part of the foregoing may be implemented as a computer program product including instructions that are stored on one or more non-transitory machine-readable storage media and/or one or more computer-readable hardware storage devices that are a hard drive, a random access memory storage device, such as a dynamic random access memory, machine-readable hardware storage devices, and other types of non-transitory machine-readable storage devices, and that are executable on one or more processing devices. All or part of the foregoing may be implemented as an apparatus, method, or electronic system that may include one or more processing devices and memory to store executable instructions to implement the stated functions.

The details of one or more embodiments are set forth in the accompanying drawings and the description below. Other features, objects, and advantages of the techniques described herein will be apparent from the description and drawings, and from the claims.

DESCRIPTION OF DRAWINGS

FIGS. 3-5A are diagrams of dataflow graphs.
FIG. 9 is a diagram of dynamic execution of multiple queries.

DESCRIPTION

A system consistent with this disclosure implements a Real-Time Transaction Tracker (RTTT). Generally, RTTT is a software program that implements operations (e.g., queries) for obtaining information from a stream of data over an extended (and unknown) period of time. RTTT allows for the ad hoc monitoring of queries in real-time applications. RTTT also supports the execution of multiple queries, added dynamically, and provides for visibility of partial results, as further described below. As used herein, real-time includes, but is not limited to, near real-time and substantially real-time, for each of which there may be a time lag between when data is received or accessed and when processing of that data actually occurs, but the data is still processed in live time as the data is received. Using RTTT, a user can specify operations (e.g., queries) to be performed (e.g., concurrently) on the data stream in real-time. RTTT generates intermediate results of the executed queries and periodically updates the intermediate results with new, subsequent results of the executed queries. Generally, an intermediate result includes a result of query execution that occurs prior to completion of query execution. RTTT also provides the user with interfaces to periodically generate (at any time) new queries for execution. As further described below, a user may also stop or terminate a query at will.

RTTT also stores only the results of the queries and discards individual items that occur in the data stream. With RTTT, a user is able to periodically and continuously monitor data and operate on it frequently (in real-time) to obtain information.

Figure 1:
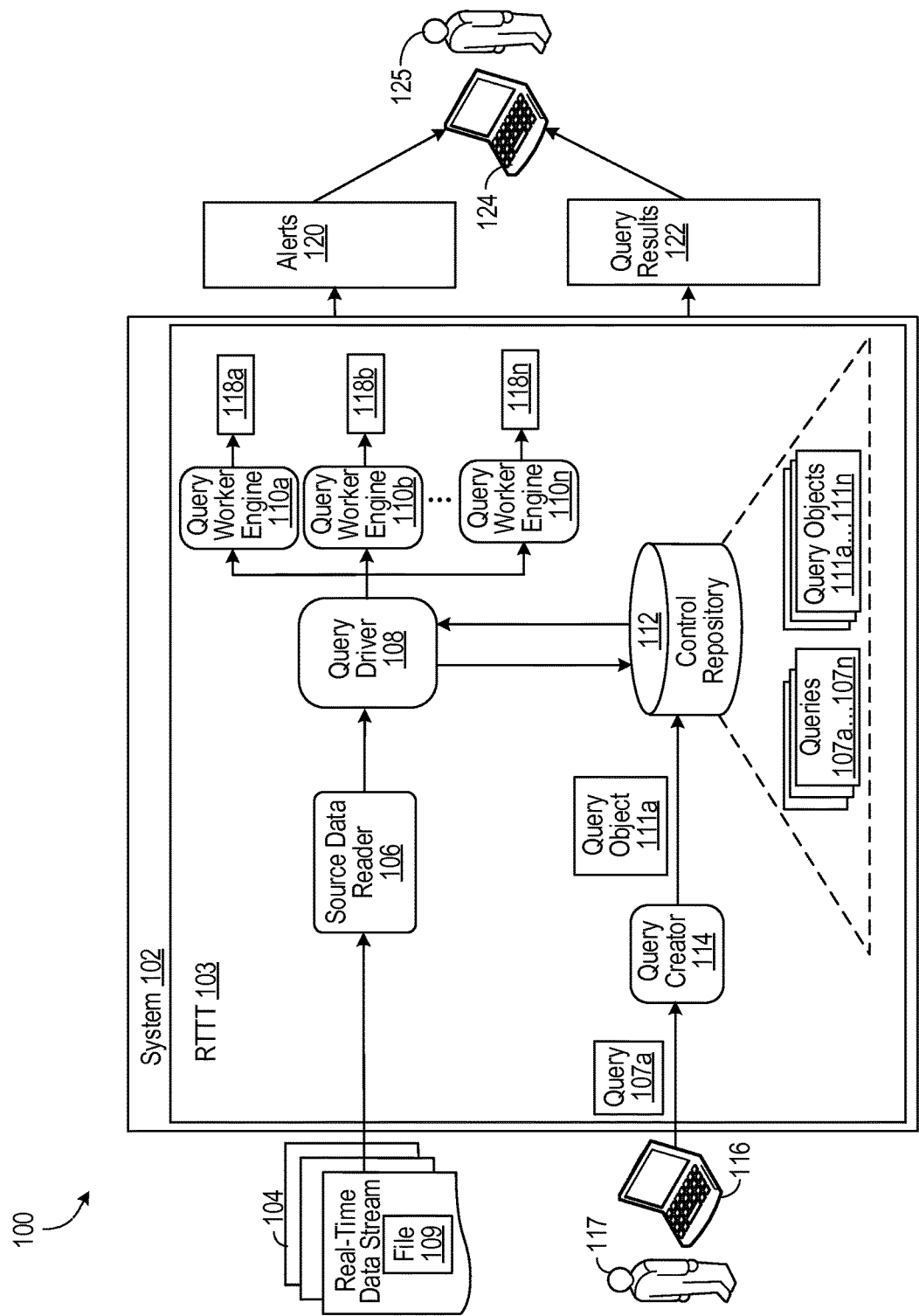
FIG. 1 is a block diagram of a data processing system.

Referring to FIG. 1, data processing environment 100 includes system 102 for implementing RTTT 103. RTTT 103 includes source data reader 106 for receiving source data, control repository 112 for storing queries 107a . . . 107n and query objects 111a . . . 111n, query driver 108 for determining which of query objects 111a . . . 111n to execute, and query worker engines 110a . . . 110n for executing queries on the source data (or on portions thereof). RTTT 103 supports execution of multiple queries, using the techniques described herein. The below description may refer to "a query" or "the query." These references to "a query" or "the query" are for purposes of convenience, without limiting the attendant description to a single query. The techniques described below are applicable to multiple queries.

Generally, source data includes data received from third party data sources (e.g., systems) that are external to system 102. Source data includes real-time data stream 104, which source data reader 106 receives from external systems. Real-time data stream 104 includes a data stream in which data items are located in different places in the stream, e.g., as the stream is being periodically, intermittently and/or continuously received. For example, some data items are located in one portion of the stream and other data items are located in another, subsequent portion of the stream. Real-time data stream 104 also includes a data stream in which data items are (i) periodically received at different times, or (ii) continuously received at different times. Real-time data stream 104 includes various types of data, including, e.g., transaction log feed data that is indicative of transactions (e.g., debit card transactions, automated teller machine (ATM) transactions, credit card transactions, charge card transactions, stored-value card transactions, international transactions for a payment card, domestic transactions for a payment card, manual cash transactions, and so forth). In the example of FIG. 1, file 109 is received in real-time data stream 104. In this example, a file is one type of source data. Generally, a file includes a set of records (e.g., two-hundred thousand records), with each record representing items of data. Records in a file may be arranged into work units, e.g., by RTTT 103. Generally, a work unit is a collection of data to be processed. For example, a work unit may represent a set of records or a subset of records. Source data reader 106 scans multiple directories (not shown) in system 102 for arrival of source data from the third party data sources. These directories are pre-configured in system 102 to receive the source data. Source data reader 106 reads the data from real-time data stream 104. Source data reader 106 reads this data a single time and uses this read data to service many queries (e.g., queries 107a . . . 107n). In this example, system 102 does not include a data store for storing (e.g., permanently) data items occurring in real-time data stream 104. Rather, real-time data stream 104 is read by source data reader 106 and then discarded, except for being temporarily stored in a buffer cache of system 102, while queries are being executed against the data in real-time data stream 104. Following execution of the queries, the contents of the buffer cache are also discarded.

RTTT 103 also includes query creator 114 that provides a user (e.g., an analyst) with user interfaces for creating queries. Query creator 114 includes a module that provides a user interface for a business analyst to generate queries. In an example, query creator 114 is a user interface for data entry. In another example, query creator 114 includes a spreadsheet template. Query creator 114 validates the query syntax and generates query worker engines (from a template), which is the executable code for a query. The executable code is stored as files on disk in system 102 and control repository 112 tracks when the queries start and stop. Query worker engines include generic executable code that be used to execute any query object, as described below. Query creator 114 also registers the query metadata (e.g., a query state) with control repository 112, which is used for control, metadata, security and audit. The query state specifies whether a query is currently executing or when as the last time the query executed.

Through the user interfaces of query creator 114, client device 116 transmits query 107a to system 102. A user may define multiple queries 107a . . . 107n that are transmitted to system 102 and stored. Client device 116 transmitting query 107a is operated by user 117 creating query 107a. Query 107a includes query syntax information that specifies a syntax for the query. Responsive to receiving query 107a, query creator 114 validates the query syntax and generates query object 111a. Query 107a includes a query specification, i.e., a detailed description of the query (e.g., query terms).

For example, query 107a is the user entered information that specifies how to process an incoming data stream (e.g., real-time data stream 104) and how to process the results for display (e.g., what results the user wants to see). Query 107a also specifies criteria for the query to execute. Query object 111a is the machine representation (i.e., machine language representation) of query 107a, so that a query worker engine can read and process the query. A query worker engine executes the query object. For purposes of convenience, and without limitation, the term query may be used to refer to a user-specified query (e.g., query 107a) or a query object (e.g., query 111a).

As previously described, the query worker engine is the executable code for a query. This executable code includes an uninstantiated dataflow graph, e.g., a dataflow graph that is not represented for a concrete instance. This uninstantiated dataflow graph includes various components. Upon reading in the query object, the query worker engine turns off certain components and turns on others, e.g., based on the components needed to execute the query as specified by the query object. That is, the query object specifies which components are to be locally executed by the query worker engine to satisfy the specifications of the query. In this example, query creator 114 generates a query object for each query. For example, query creator 114 generates query objects 111a . . . 111n for queries 107a . . . 107n, respectively.

In an example, system 102 generates data for a graphical user interface (GUI) through which a user inputs data that is used in producing the query and the query specification. Through the GUI, the user inputs a query identifier (ID), which is associated with the query and used to identify the query. The query ID is also used to retrieve the query specification and to name per-query results files, e.g., files for storing intermediate and final results of query execution, as described in further details below. The user also inputs, into the query specification, data specifying a start time for execution of the query, a stop time for execution of the query, and a reporting interval (e.g., how often a user may view results of executing the query). By specifying the start/stop time for the query, a user can schedule the query to run at a specific time and to run for specific times. In a variation, system 102 provides a user with a control (e.g., via a display in a graphical user interface) that provides for automatic starting and stopping of queries.

Through query creator 114, a user may dynamically add one or more queries for real-time execution. Once a query is created, the user may dynamically add the query (e.g., to a set of multiple queries being executed) by updating the query specification to specify a new start time (e.g., to be a current time) and/or a new stop time. That is, via the query creator 114, a user may dynamically add additional queries to a set of multiple queries that are already executing. The user may dynamically and in real-time add multiple queries for real-time, present execution.

Query 107a also includes a name of a compiled dataflow graph to execute to implement the query. Generally, a dataflow graph is a directed graph. This name of the compiled dataflow graph is saved as part of the query specification. As described in further detail below, the query is implemented via a dataflow graph that applies the query to portions of real-time data stream 104. In this example, data processing environment 100 is an environment for developing a query as a dataflow graph that includes vertices (representing data processing components or datasets) connected by directed links (representing flows of work elements, i.e., data) between the vertices. For example, such an environment is described in more detail in U.S. Publication No. 2007/0011668, titled "Managing Parameters for Graph-Based Applications," incorporated herein by reference. A system for executing such graph-based queries is described in U.S. Pat. No. 5,966,072, titled "Executing Computations Expressed as Graphs." Dataflow graphs made in accordance with this system provide methods for getting information into and out of individual processes represented by graph components, for moving information between the processes, and for defining a running order for the processes. This system includes algorithms that choose inter-process communication methods from any available methods (for example, communication paths according to the links of the graph can use TCP/IP or UNIX domain sockets, or use shared memory to pass data between the processes).

The dataflow graphs developed using system 102 can be stored in control repository 112 (or another data repository) and accessed by RTTT 103. RTTT 103 may execute the dataflow graphs to carry out queries associated with the components of the dataflow graphs to process the data received in real-time data stream 104.

Using query creator 114, a user may specify various query criteria and query parameters for a query. Generally, query criteria include conditions (e.g., types of data to be queried) to be satisfied prior to execution of a query. In an example, queries are selected for execution based on query start times, e.g., rather than based on query criteria. That is, a user specifies a start time for a query and the query "wakes-up" or starts executing at that time. There are various types of query parameters, including, e.g., attributes to be displayed in results (e.g., which attributes a user wants to view in query results), aggregation keys that specify how to aggregate the query results, filter conditions, sort conditions (e.g., information specifying how to sort the query results, such as based on date, output styles (e.g., information specifying a format for output of the query results), and alert thresholds (information specifying one or more pre-defined conditions that trigger sending an alerts).

For example, a user may specify filter conditions—information specifying how to filter items of data included in real-time data stream 104. Filter conditions indicate which types of data to filter out of (exclude from) the query results and which types of data to filter into (include in) the query results. Based on the user provided filter conditions, system 102 updates query object 111a with the filter conditions and provides the query object 111a to a query worker engine to enable the query worker engine to filter the query results in accordance with the user's filter conditions.

Using query creator 114, a user may also define custom operations for data transformation on the query results. A user may specify an operation to read and to convert Extended Binary Coded Decimal Interchange Code (EBCDIC) date times. A user may specify another operation to convert a format of data items representing currency amounts into a United States dollar (USD) currency. A user may specify still another type of operation to determine a payment card type (e.g., a debit card, an ATM card, a stored-value card, a credit card, a charge card and so forth) from types of data in real-time data stream 104. Through the query parameters and user-defined custom operations, a query worker engine (e.g., one of query worker engines 110a . . . 110n) is able to customize the query results in accordance with the user's specification. In particular, the query worker engine accesses (e.g., via query object 111a in control repository 112) information indicative of the user-defined custom operations for data transformation on aggregated (e.g., final) results of executing a query. The query worker engine executes the user-defined custom operations on the aggregated results and transforms (e.g., modifies) the aggregated results in accordance with the user-defined custom operations.

Query creator 114 stores query 107a and query object 111a (in association with each other) in control repository 112 (e.g., a data repository for storage of queries and associated query objects). In this example, control repository 112 stores queries 107a . . . 107n and query objects 111a . . . 111n to be executed on real-time data stream 104. In this example, queries 107a . . . 107n include query 107a and query objects 111a . . . 111n include query object 111a. Query creator 114 provides for audit and security of query 107a, as previously described. Query creator 114 also registers query objects 111a . . . 111n with query driver 108.

Query driver 108 is a portion of RTTT 103 that selects one or more of query objects 111a . . . 111n for execution and determines when to execute those selected query objects, as described in further detail below. Query driver 108 includes a continuous application that reads a real-time stream of source data on an incoming message bus. In an example, query driver 108 continuously executes a dataflow graph. Via the dataflow graph, query driver 108 is configured such that when it detects or receives more data (e.g., from a data stream), query driver 108 checks control repository 112 to determine which query object to run. Query driver 108 instantiates one instance of query worker engine for every query object that needs to be run.

Query driver 108 polls (e.g., intermittently) control repository 112 for queries that are active and scheduled to be run (e.g., at a current time and/or at an upcoming time). By intermittently polling control repository 112 for active queries, query driver 108 enables execution of multiple queries that are added dynamically, e.g., by being scheduled to start at a particular time. As described herein, queries can be scheduled to start and to stop at a specified time. For a given (original) set of queries that are already executing, query driver 108 may identify additional queries to be added to the original set of executing queries, e.g., based on results of polling control repository 112. In this example, these additional queries are scheduled for execution at a time that is subsequent to the execution time for the queries in the original set. By intermittently polling control repository 112, query driver 108 dynamically adds to the already executing queries, by adding more additional queries to be executed. In a variation, control repository 112 pushes to query driver 108 information specifying which queries to execute (and when), when the queries are registered with control repository 112. This pushed information includes information specifying an active query worker engine for the registered query. There are various ways in which a query is registered with control repository 112, including, e.g., by generating a query object for the query and storing the query object in control repository 112.

Query driver 108 batches the incoming data into small work units, e.g., all data that arrived in the last 5 seconds. For each work unit, query driver 108 determines which query objects to execute by polling control repository 112 to determine the active query worker engines at that time, as previously described. These active query worker engines represent the currently active queries. As previously described, a query has a start time. The query worker engine is programmed to turn on (e.g., be listed as active) at that start time. Query driver 108 calls one instance of the query worker engine for every query to be executed for the current unit of work. When the query worker engines finish execution, the control passes back to query driver 108 and it updates a query state in the control database (e.g., control repository 112).

In a variation, when query creator 114 registers one of query objects 111a ... 111n with query driver 108, and query driver 108 stores (e.g., in its memory cache) data specifying query criteria for execution each of query objects 111a ... 111n and query IDs for each of query objects 111a ... 111n. Using the stored information, query driver 108 determines which of query objects 111a ... 111n should be executed against real-time data stream 104 in real-time and as real-time data stream 104 is received. Query driver 108 makes this determination by determining the user-specified start and stop times of queries, e.g., based on the query specification for these queries. In some examples, a query specification specifies a start and a stop time for a query. In another example, query driver 108 makes this determination by comparing the query criteria to qualities (e.g., attributes) of data items in real-time data stream 104. When query driver 108 determines that query criteria of one or more of query objects 111a ... 111n is satisfied (and/or that certain queries should start in accordance with start times), query driver 108 uses the appropriate query IDs to retrieve, from control repository 112, the queries for which the query criteria are satisfied and to retrieve query objects for the appropriate queries. In another example, the query specification indicates that the query should be executed for as long as real-time data stream 104 includes data satisfying the query criteria of the queries being executed.

Query driver 108 implements a graph (e.g., a continuous group, a periodic graph, and so forth) that reads real-time data stream 104 from source data reader 106. Using the graph, query driver 108 determines which data items of real-time data stream 104 satisfy query criteria of queries query objects 111a ... 111n stored in control repository 112. Upon identification of a query for which query criteria are satisfied, query driver 108 calls an instance of a query worker engine (e.g., one of query worker engines 110a ... 110n). In a variation, query driver 108 polls control repository 112 for a list of active query workers engines and applies these active query worker engines to the real-time data stream 104 or portions thereof. Query driver 108 also records, as part of the query state for a query in control repository 112, query execution statuses (e.g., an audit trail) to track which queries have been executed, when the queries are executed, and for how long.

Generally, a query worker engine is a generic program that can support a user query. One instance of the query worker engine is spawned by query driver 108 for every user query that needs to be executed for a given unit of work. Only those query worker engines are instantiated where the current system date time is within the monitoring period for a corresponding query. The actual user query drives the features of the query worker (for example, if the specific user query has no aggregation or sort, these functions are turned off for the corresponding instance of the query worker). The query worker engine also computes alert metrics and delivers alerts at threshold, if requested to do so.

A query worker engine includes a graph (e.g., a single generic graph) for a query, e.g., one of query objects 111a ... 111n. The query object is executed through execution of the graph. Query driver 108 generates or selects one instance of a query worker engine as a graph, per executed query. In the example of FIG. 1, query driver 108 executes (e.g., concurrently) query objects 111a ... 111n against data items in real-time data stream 104. To execute these query objects, query driver 108 generates or selects query worker engines 110a ... 110n. In this example, query worker engines 110a ... 110n execute query objects 111a ... 111n, respectively.

In an example, an amount of data items in real-time data stream 104 is unknown at a start of executing one of query objects 111a ... 111n. Additionally, data items appear in real-time data stream 104 for a period of time. The end of this period of time is unknown at a start of executing one of query objects 111a ... 111n. In this example, source data reader 106 receives file 109 in real-time data stream 104. In this example, source data reader 106 receives a new file at specified time intervals (e.g., every five minutes). Query driver 108 determines which of query objects 111a ... 111n should be executed against file 109. In this example, query driver 108 determines that each of query objects 111a ... 111n should be executed against file 109. As such, query driver 108 generates or retrieves query worker engines 110a ... 110n to execute (concurrently) query objects 111a ... 111n against file 109. This process is then repeated when the next file arrives, e.g., for queries with start and end times that specify that the query is still active and executing. In this example, source data reader 106 reads in file 109 and transmits file 109 to query driver 108. Query driver 108 transmits file 109 to each of query worker engines 110*a* . . . 110*n* to use when executing query objects 111*a* . . . 111*n*, respectively.

A query worker engine also generates alert metrics and delivers alerts, for a query. For example, when a user is defining a query specification, the user will specify various pre-defined events that trigger an alert (e.g., a notification message specifying the occurrence of an event). These events may be stored in a query object for an associated query. In another example, the user may specify a threshold for an event, with the user requesting to be notified when a number of the events exceeds the threshold. Generally, an event includes an occurrence of one or more pre-specified data values or types. Query driver 108 transmits to each of query worker engines 110*a* . . . 110*n* data indicative of the predefined events for the various queries being executed via query worker engines 110*a* . . . 110*n*, to enable query worker engines 110*a* . . . 110*n* to generate appropriate alerts.

Based on execution of query objects 111*a* . . . 111*n* against data items in real-time data stream 104, query worker engines 110*a* . . . 110*n* generate intermediate results 118*a* . . . 118*n*. Intermediate results 118*a* . . . 118*n* are available (for user review) throughout the duration of query execution. As described in further detail below, query worker engines 110*a* . . . 110*n* combine intermediate results 118*a* . . . 118*n*, respectively, with subsequent results of subsequent executions of query objects 111*a* . . . 111*n*. These combined results produce either new intermediate results or final results (e.g., when execution of a query has ceased).

Using intermediate results 118*a* . . . 118*n* (or final results), query worker engines 110*a* . . . 110*n* generate alerts 120 and query results 122 (e.g., in comma separated values (CSV) form or in Structured Query Language (SQL) format) for the executed queries. In an example, the query results include partial results, e.g., the results of query execution up to a current point in time, while the query is still executing and prior to completion. In this example, the partial results are continuously and/or periodically updated with new results, e.g., as the queries continue to be executed. The partial results are also displayed in real-time, e.g., as RTTT 103 detects that one or more items of real-time data satisfy one or more of the conditions of the query. As RTTT 103 continuously detects that new items of the real-time data satisfy the query condition(s), RTTT 103 updates and displays the partial results, e.g., based on the newly detected items. In this example, system 102 transmits alerts 120 and query results 122 to client device 125. In an example, query results 122 are stored in control repository 112 for subsequent retrieval. Generally, an alert includes a notification message that informs the user of a detected event. Generally, query results include a visualization of results of executing a query and include information specifying how often and when a particular event is detected. Alerts 120 may be email or simple messaging service (SMS) alerts. System 102 may be configured to deliver the alerts at defined thresholds, e.g., information specifying a magnitude (e.g., a magnitude of events) that must be exceeded for an alert to be sent. Alerts 120 and query results 122 are each transmitted to client device 124, e.g., for viewing by user 125 of client device 124. System 102 outputs various types of query results, including, e.g., a consolidated output and an appended output. Generally, a consolidated output includes data that quantifies the results into charts and other visualizations. Generally, an appended output includes a data file of the results. Because the queries are run in real-time (and as real-time data stream 104 is received), system 102 is able to deliver results in real-time and within minutes of data arrival.

In an example, data processing environment 100 is used to determine when a payment card (e.g., a debit card, an ATM card, a stored-value card, a credit card, a charge card and so forth) is at risk for fraudulent activity. In this example, system 102 receives from an entity issuing the card (e.g., the issuing entity) information specifying one or more cards that are at risk. In this example, source data reader 106 receives, from systems of the issuing entity, a real-time data stream indicative of transactions. Based on the real-time data stream, system 102 monitors transactions from cards at risk and determines a count of the number and types of transactions initiated by these cards. There are various types of transactions, including, e.g., a manual cash transaction, an ATM transaction, a domestic use transaction, an international use transaction, a debit card transaction, a charge card transaction, a stored-value card transaction, a credit card transaction, and so forth. In this example, an employee (e.g., an analyst in the fraud protection division) uses query creator 114 to specify alert conditions. For example, an alert condition specifies that when system 102 determines a threshold amount of transactions of a various type (e.g., international use transaction) for a card at risk to alert the systems of the issuing entity (e.g., so that the issuing entity may decline the transaction).

RTTT 103 is also used for sales analysis to determine total sales and a count of transactions for a particular product in a particular country for a particular period of time (e.g., for a period of N hrs. starting 15/NOV/2013 08:00:00). RTTT 103 may be used to monitor a total number of marketing offer declines by region, country, and so forth. A user may configure RTTT 103 to specify that he/she would like to be notified if the total number of declines exceeds a threshold. RTTT 103 may be used to generate an alert if any of the mandatory columns in incoming data is NULL or blank.

In an example, RTTT 103 also performs real-time rolling window operations (e.g., aggregations) for alerting. For a defined time window, there are various types of operations, including, e.g., a sum operation, a count operation, an average operation, a minimum operation, a maximum operation, and so forth. The size of the time window itself is a user-defined parameter (e.g., 10 minutes, 60 minutes, and so forth). For example, a user could configure RTTT 103 to count a number of declines of an offer for a rolling ten minute time window. A user may also define various alert thresholds that specify when and how (e.g., via e-mail, via SMS, and so forth) the user wants to be notified. For example, the user may specify that when the count of declines is greater than a threshold amount to notify the user by sending an email alert.

In another example, a financial institution is planning to launch a new product portfolio in a region and the business users would like to monitor the uptake of the product for the first 'N' hours (monitoring period) after the launch. They want to monitor several metrics such as the count of customers who have signed up, the total amount committed, broken by product and geography. They also want an alert during the monitoring period, when a new customer invests more than a certain threshold amount in a product. They need to monitor the uptake of the portfolio regularly during the monitoring interval and need the information on demand to plot a trending chart. In this example, the business users do not want to wait to the end of the monitoring period, when the entire dataset will be available in the data warehouse for SQL queries and analysis. In this example, the incoming data feed is not stored in a new dedicated reporting repository for the short term monitoring requirement, which would cause duplication of the data with the data warehouse. Using the techniques described herein, the data is queried "on the fly" to provide requested monitoring information to the users in real-time. Additionally, users can pre-configure hundreds of queries, each with their own monitoring period. These queries run concurrently. Each query does real-time computation on a continuous stream of data and continually generates results that are available to the business. At the end of the monitoring interval for each individual query, the system pushes the final result to the recipients and automatically purge the query to free up system resources.

In an example, there is one stream of data for each query driver. In this example, a stream of data includes records of one format. In this example, for multiple streams of data, with each stream representing a records of a particular format, a data processing environment includes multiple query drivers, with each query driver being assigned to one of the data streams.

Figure 2:
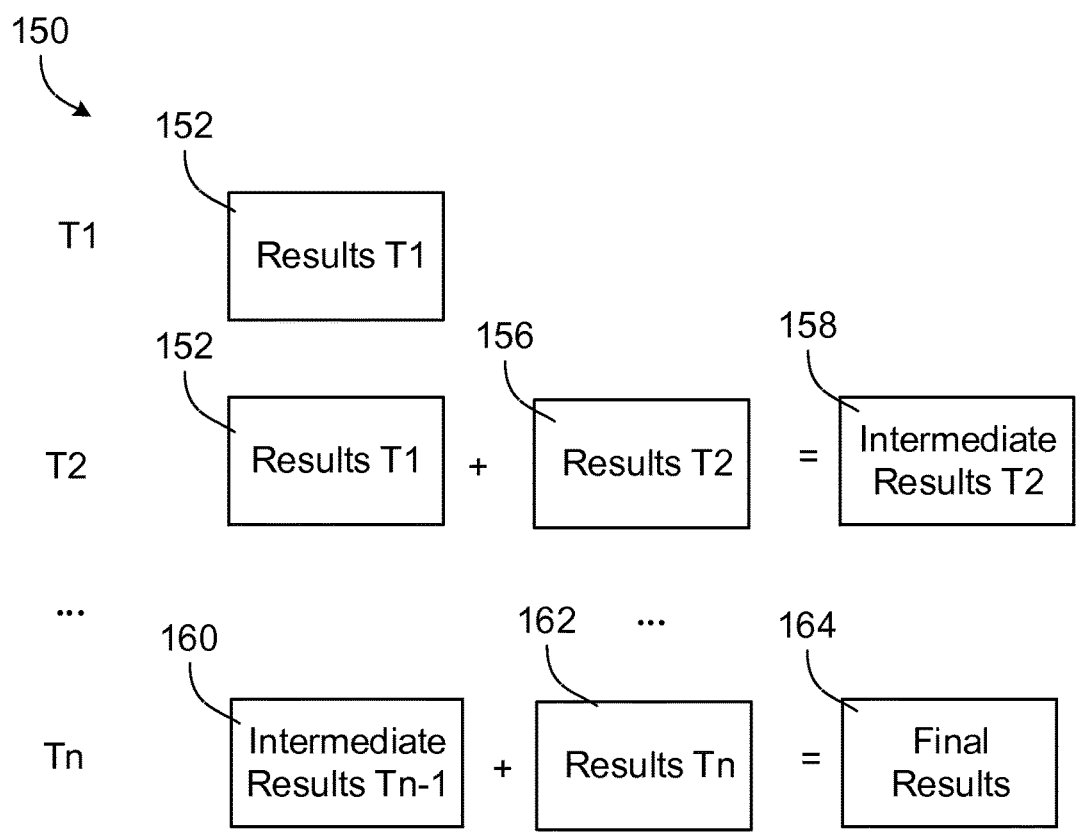
FIGS. 2, 5B and 8 are each a conceptual diagram of aggregating results of data processing.

Referring to FIG. 2, diagram 150 conceptually illustrates aggregating intermediate results of query execution with subsequent results of query execution. In this example, a particular query is executed at time T1. Based on execution of the query, RTTT 103 generates results 152 (e.g., results at time T1). At time T2 that is subsequent to time T1, the query is again executed (e.g., this time against different data). For example, the query may be re-executed against a new file that is received. Based on execution of the query at time T2, RTTT 103 generates results 156, which are results of executing the query at time T2. RTTT 103 combines results 152 with results 156 to generate intermediate results 158 at time T2. Generally, intermediate results are the aggregate of all results up to and include the current time period. This process of determining new intermediate results at each subsequent time continues, until time Tn. At time Tn, execution of the query is complete. Additionally, at time Tn, RTTT 103 determines results 162 for execution of the query at time Tn. RTTT 103 generates final results 164 for query execution by combining intermediate results 160 (which is the aggregated results for all times prior to time Tn) with results 162. In this example, intermediate results 160 are the intermediate results at time Tn−1. Results 162 are the results at time Tn (e.g., the results at time Tn only).

Figure 3:
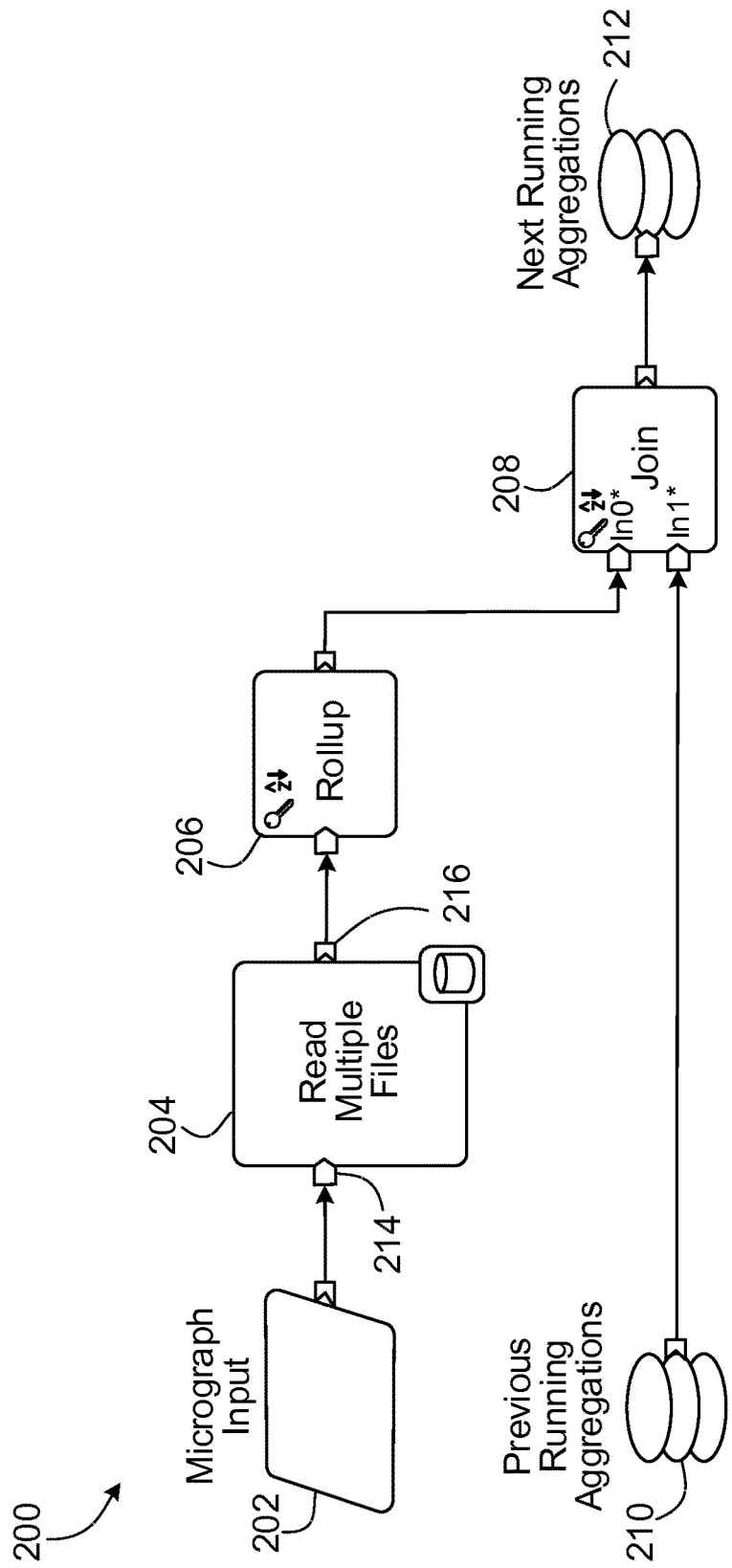

Referring to FIG. 3, micrograph 200 is shown. In general, a micrograph is a specialized sub-graph configured to be retrieved dynamically and embedded within a run-micrograph component. A system for executing such dynamically loaded graphs is described in U.S. patent application Ser. No. 13/161,010, "Dynamically Loading Graph-Based Computations", incorporated herein by reference. In some implementations, the micrograph may be precompiled.

In some examples, micrograph 200 is displayed in a user interface that allows a dataflow graph to be viewed, configured, and/or executed. Micrograph 200 represents a data processing operation that is performed by RTTT 103 on system 102, as shown in FIG. 1. In an example, a query worker engine executes micrograph 200 (or an instance of a micrograph). Micrograph 200 runs a query on portions of a real-time data stream. For example, files (e.g., portions of the real-time data stream) arrive at system 102 at predefined time intervals (e.g., every five minutes). In response, system 102 keeps the files in a buffer cache of system 102, while multiple queries are run against the files. For the files received at the predefined intervals, system 102 executes a micrograph (e.g., micrograph 200) for each query to be run on the files.

In this example, micrograph 200 includes component 202 representing an operation called "micrograph input," which is referred to hereinafter as micrograph input component 202. Micrograph input operation receives (e.g., from a component in another dataflow graph that is calling micrograph 200 and thus passing data to micrograph 200) information specifying which query is to be executed and formatted data on which the query is executed (e.g., a formatted file, a formatted work unit, and so forth). Micrograph 200 also includes component 204 representing an operation called "read multiple files," which is referred to hereinafter as read multiple files component 204. In this example, data flows from micrograph input component 202 to read multiple files component 204. Read multiple files component 204 reads files from a database and adds them to the input information received via micrograph input component 202. For example, read multiple files component 204 may read information specifying how the results of a certain query are to be output for user review, how the results are to be sorted, which types of data is to be filtered out of the query, and so forth. In an example, read multiple files component 204 reads in a data file that contact the query object for the query to be executed. Using the query object, the query can then be executed or the results obtained in a manner consistent with the query object. Read multiple files component 204 outputs the results of adding the read files to the input data to rollup component 206.

A rollup component aggregates data, e.g., results of executing a query against data. In this example, rollup component 206 applies the query (e.g., the query terms or query string) to the output of read multiple files component 204. Based on applying the query, rollup component 206 determines results of applying the query to the file(s) or the partitioned groupings of data. The results include data that matches the query terms or that correspond to the types of data specified by the query string.

In this example, rollup component 206 aggregates the query execution results, e.g., for this particular execution of the query against the most recently received file or work unit. Rollup component 206 aggregates individual data items into a single data item or provides a count for the number of individual data items, depending on the configuration of rollup component 206. The output of rollup component 206 is the aggregated results of applying the query to the file or to a work unit. Rollup component 206 may also output the results in a format or manner specified by the query object.

Micrograph 200 also includes previous running aggregations component 210 that stores data indicative of prior aggregated results of applying the query to the previously received files. These prior aggregated results are stored in a per-query results file, e.g., a file that stores results (e.g., intermediate results) for a particular query. The per-query results file holds running totals, which can be reported back to the user at pre-defined intervals (e.g., each five-minute interval, or some multiple of five-minute intervals). The per-query results file is stored in a data repository (e.g., control repository 112) and is accessed by previous running aggregations component 210.

Data flows from previous running aggregations component 210 and rollup component 206 to join component 208 that implements a join operation. The "join" operation combines two types of data, for example, one type of data included in one data source and another type of data contained in another data source. In this example, join component 208 joins the current results of application of the query (e.g., the output of rollup component 206) and the output of previous running aggregations component 210. Join component 208 writes a new per-query results file that combines (i) the current aggregate results for the current execution of the query, (ii) with the prior, aggregated results for prior executions of the query. Based on this combination, join component 208 produces a new aggregate result (that is the combination of the current and prior aggregated results). Join component 208 stores the new aggregate results in a new per-query results file in the data repository. These new aggregate results are intermediate results. These intermediate results are later joined with subsequent results, e.g., at a later point in time.

Data (e.g., the intermediate results) flows from join component 208 to next running aggregations component 212. The next running aggregations component 212 updates the data repository with the new per-query results file (that includes the intermediate results), to enable previous running aggregations component 210 to access this per-query results file, e.g., during the next execution of the query.

Each component of the micrograph 200 includes one or more connection ports through which the component can be connected by a dataflow connection (also referred to as a "connection") to one or more other components of the dataflow graph. A connection port may be an input port for receiving data into a component or an output port through which data is output from a component. In some examples, a symbol that depicts a connection port may indicate whether the connection port is an input port or an output port. For instance, in the example of FIG. 3, read multiple files component 204 has input port 214 represented by an input port symbol and output port 216 represented by an output port symbol.

In this example, at least some of the components in micrograph 200 perform a checkpoint operation that saves in a buffer (e.g., of system 102) a local state of the component to enable recoverability of a state of the dataflow graph. The components in the other dataflow graphs described herein similarly perform checkpointing.

Figure 4:
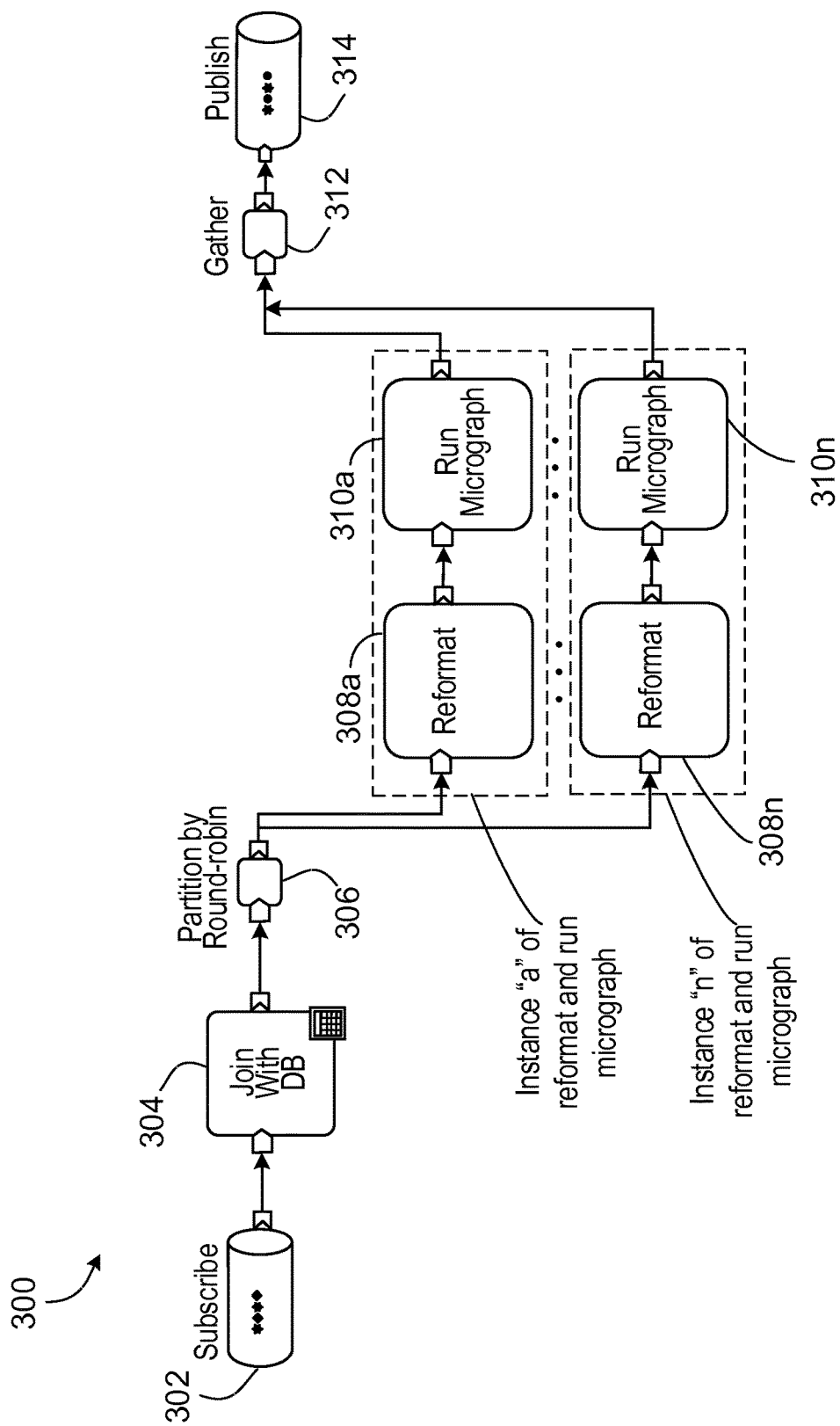

Referring to FIG. 4, dataflow graph 300 executes queries against a file, e.g., as it arrives. In an example, a query driver executes dataflow graph 300. These queries are executed by implementing a micrograph (e.g., micrograph 200) for each query. Dataflow graph 300 includes subscribe component 302 that subscribes to (e.g., receives data from) a source data reader. Through subscribe component 302, dataflow graph 300 accesses, in real-time, items of data included in a real-time data stream. In this example, subscribe component 302 receives a file (e.g., including thousands of records). Data flows from subscribe component 302 to join component 304. Join component 304 reads data (e.g., records) from a data source (or multiple data sources) in a sequence and arranges the input data into a sequence of discrete work units. As previously described, the work units may represent records stored in a predetermined format based on input records, for example, or may represent transactions to be processed, for example. In some implementations, each work unit may be identified by a number that is unique within the batch, such as a count of work units processed. The work units are then passed in sequence to the next component in the dataflow graph.

Join component 304 also joins the file with currently active queries. Generally, a currently active query is a query that query driver has determined should be executed against a real-time data stream. In an example, join component 304 retrieves a list of currently active queries to be executed. This list is retrieved from either query driver 108 (FIG. 1), when stored locally on query driver 108, or from control repository 112. The list specifies query IDs of queries to be executed. The currently active queries are determined based either on real-time or file time.

For example, a data repository includes a database table of currently active queries. The currently active queries are identified in the table by query IDs. For each currently active query, the database table also specifies a timestamp. The timestamp specifies at time at which query driver 108 determines that the query should be executed. In some examples, join component 304 identifies, in the database table, queries with timestamps that occur within a current file time (e.g., a current time interval in which files are being currently received). In other examples, join component 304 identifies, in the database table, queries with timestamps that are close to a current time (e.g., timestamps for which a difference between the current time and a time specified by the timestamp is less than a threshold amount of time). In still another example, join component 304 selects queries that are specified as being currently active queries. Join component 304 selects the currently active queries and joins these selected queries with the real-time data. Join component 304 also retrieves the query specifications for the selected queries, for use in processing the query.

Data flows from join component 304 to partition component 306, which partitions (e.g., allocates) the currently active queries to be processed (e.g., on the same file) to multiple component instances, e.g., instances 308a . . . 308n of reformat component (hereafter reformat components 308a . . . 308n) and instances 310a . . . 310n of run micrograph component (hereafter run micrograph components 310a . . . 310n). That is a partition represents a division of the currently active queries across various instances of components. In this example, there are "n" currently active queries. In this example, the file is processed "n" times, once for each query. By partitioning the queries, the queries may be in run in parallel with each other (and across various distributed systems). Partition component 306 partitions the queries in a round-robin manner, by assigning a first query to a first of the instances, a second query to a second of the instances, and so forth. In an example, a portion of the instances are executed on a system, thereby distributing all instances across various systems.

When processing of a work unit is completed the results are passed to a gather component 338 that collects results from multiple instances and passes them to the next data processing component in the dataflow graph.

Data (e.g., data specifying the partitioning of the queries and the current file) flows from partition component 306 to reformat components 308a . . . 308n. Each of reformat components 308a . . . 308n corresponds to one of the currently active queries. Reformat component represents a reformat process, so that when dataflow graph 300 is executed by system 102, the reformat process represented by a reformat component is executed. Generally, a reformat process includes a series of instructions for converting data from one format to another format. In this example, a reformat component reformats the data records (e.g. in the current file) to a format that is readable by a dataflow graph.

The reformatted data flows from reformat components 308a . . . 308n to run micrograph components 310a . . . 310n, which execute a micrograph to execute a query (serially) on data records in a file. In particular, run micrograph component 310 selects a micrograph (e.g., micrograph 200) to execute. For each query, a micrograph is executed, e.g., to serially process the queries against a file. In this example, each of run micrograph components 310a ... 310n corresponds to one of the "n" queries to be processed against the current file.

Dataflow graph 300 also includes gather component 312, which collects the results of execution of the queries against the data records in the file. Generally, gather component 312 collects results from run micrograph components 310a ... 310n and passes them to the next data processing component in dataflow graph 300. Data flows from run micrograph components 310a ... 310n to gather component 312. Gather component 312 collects the results of execution of the queries, e.g., by accessing the per-query results files for the queries that are executed. Data indicative of the results of the query executions flows from gather component to publish component 314, which publishes the results, e.g., in a results-viewing GUI that displays the contents of the per-query results file for a given query ID or for multiple query IDs. In an example, the per-query results file stores both the subtotals from the last query execution and the running grand totals. In this example, the GUI includes a dashboard that displays results for the last five minutes and results since the query first started running. The dashboard also displays multiple sets of totals on different time scales, e.g., results for the last 5 minutes, the last 10 minutes, the last 30 minutes, and so forth. The dashboard displays varying levels of granularity, e.g., results for one or more particular queries and/or results for all queries.

Figure 5A:
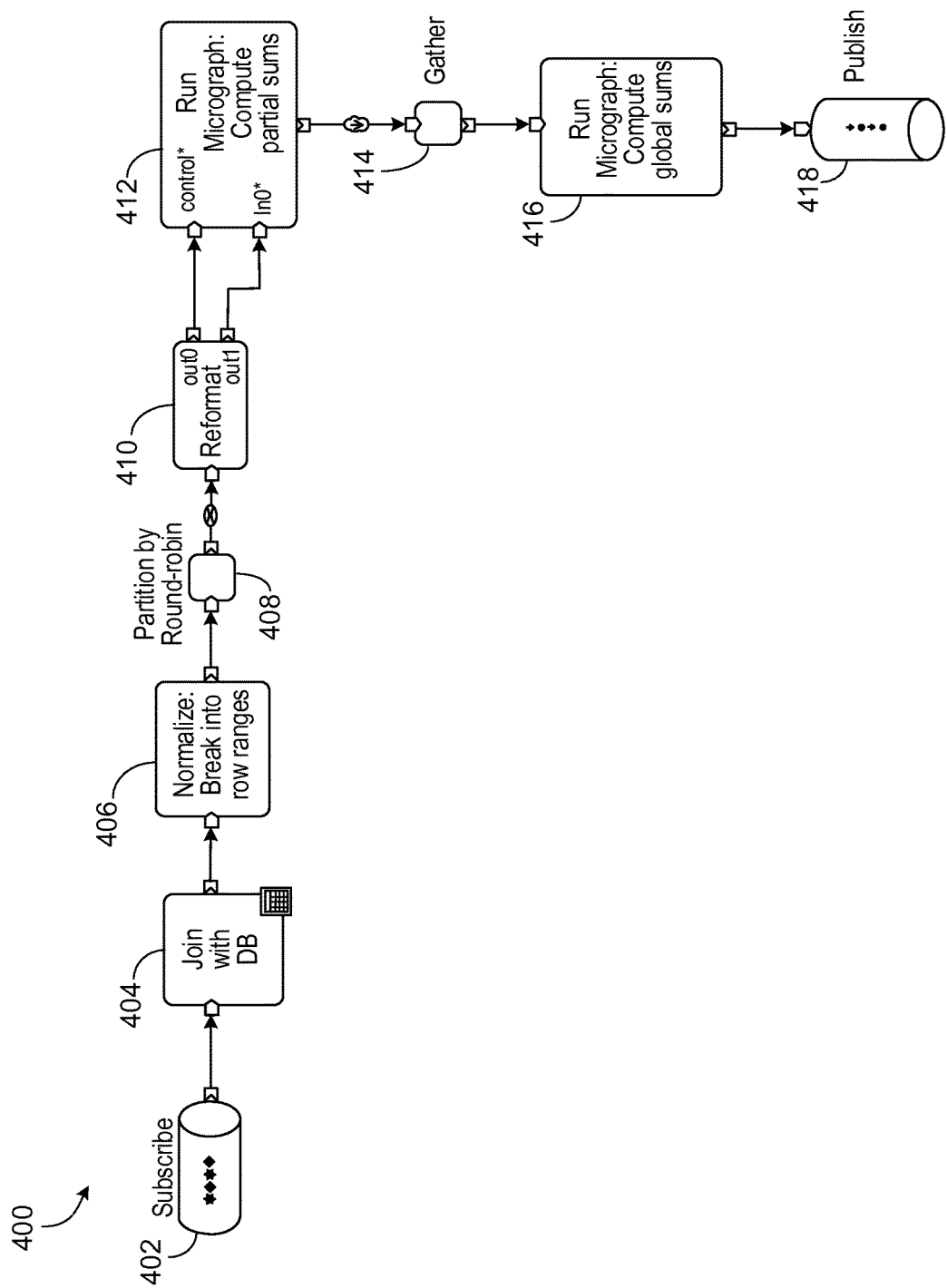

Referring to FIG. 5A, dataflow graph 400 implements parallelism within a given file/query combination, e.g., to both execute multiple queries in parallel and to further process, in parallel, the data records for a particular query. This process improves scalability for large files (e.g., files exceeding 2 gigabytes), thereby reducing processing time and increasing processing speed. For example, system 102 processes a file a predefined number of times (e.g., N times), because the file is processed for each relevant query. In this example, when there are N relevant queries, system 102 processes the file N times. A query can be processed either serially or in parallel. When a query is processed serially, the query is serially applied to the data items in the file. Rather than serially processing a query, dataflow graph 400 processes the data for a particular query in parallel, e.g., by dividing the data in the current file into work units and then applying the query in parallel to the work units.

Dataflow graph 400 includes subscribe component 402 (which performs the functionality described with regard to subscribe component 302 in FIG. 4) and join component 404 (which performs the functionality described with regard to join component 304 in FIG. 4). Data flows from join component 304 to normalize component 406, which divides the contents of the file into a series of row ranges for processing of the data in parallel. For example, the file includes rows of data, e.g., with each row representing a data record. Normalize component 406 assigns the rows to various row ranges (e.g., subsets of the rows). A row range represents a work unit. In an example, a file has ten thousand rows of transaction data. In this example, rows 1-1000 are assigned to row range I (e.g., a first work unit), rows 1001-2000 are assigned to row range II (e.g., a second work unit), and so forth.

Data flows from normalize component 406 to partition component 408 (which performs the functionality described with regard to partition component 306) to allocate instances of reformat 410 and run micrograph 412 to each work unit. As previously described, a partition represents a division of the currently active queries across various instances of components. In this example, each partition processes a different subset of the rows (or work unit). Partition component 408 allocates the queries to be executed (e.g., the currently active queries) to each work unit. For example, for each work unit, a total number of queries to be executed are allocated to various instances of reformat 410 and run micrograph 412 for that work unit.

Data indicative of the partitions (for each work unit) flows from partition component 408 to instances of reformat component 410 to reformat the data in the work units for input into a dataflow graph (e.g., a micrograph graph). The reformatted data flows to instances of run micrograph component 412 that computes partial sums for execution of the queries against a particular work unit. Run micrograph component 412 implements the functionality that was described with regard to run micrograph component. Each instance of run micrograph component 412 executes a particular query for a particular work unit, as described in further detail below for FIG. 5B. That is, if there are "p" queries to be executed, each work unit is processed "p" times. The work units are processed in parallel. For each work unit, the queries are processed in parallel. Generally, a partial sum is data indicative of results of execution of the query on a portion of data (e.g., a portion of a file or a particular work unit). For each work unit, an instance of run micrograph component 412 is executed for each currently active query. To do so, system 102 generates p different instances of run micrograph component 412, with each instance of run micrograph component 412 being for one of the "p" currently active queries. Dataflow graph 400 includes gather component 414, which gathers together, for a work unit, the partial sums for execution of the queries against that particular work unit. In this example, data (e.g., data indicative of the partial sums) flows from gather component 414 to run micrograph component 416, which computes global sums. Generally, a global sum is data indicative of final results of execution of a query against a file (e.g., execution of a query against all the row ranges (work units) for the file). To compute the global sums, run micrograph component 416 executes another micrograph that aggregates the results for execution of each query on each work unit. In an example, each query has an associated instance of run micrograph component 416 to compute global sums for that query (e.g., results of executing that query against all the work units). That is, run micrograph component 416 computes a global sub (e.g., for a particular query) by aggregating the partials sums (across the different work units) for that particular query. Data indicative of the global sums flows from run micrograph component 416 to publish component 418 to publish the global sums (e.g., the results of executing the queries against the file). The functionality of publish component 418 includes the functionality previously described for publish component 314.

Figure 5B:
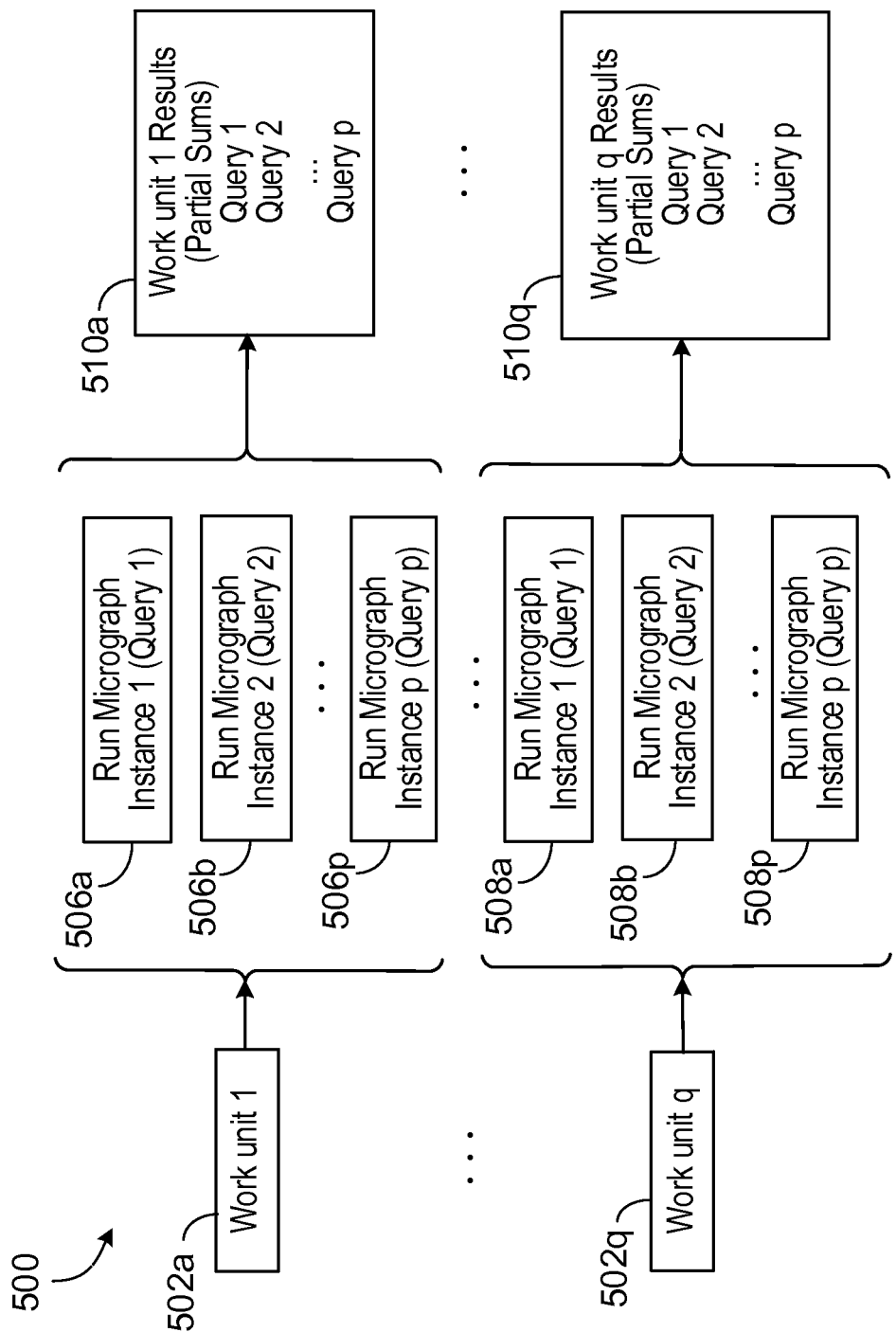

Referring to FIG. 5B, diagram 500 illustrates an example of results of execution of components 406, 408, 410, 412 and 414 in FIG. 5A. In this example, normalize component 406 divides a file into "q" work units, e.g., work units 502a ... 502q. In this example, there are also "p" currently active queries to be executed against the file. As previously described, partition component 408 is applied to each of work units 502a ... 502q. Application of partition component 408 to each of work units 502a ... 502q partitions the "p" queries across "p" different instances of run micrograph component 412, for each work unit. In this example, partition component 408 generates, for work unit 502a, instances 506a ... 506p of run micrograph component 412, with each instance corresponding to a query. Partition component 408 generates, for work unit 502*q*, instances 508*a* . . . 508*p* of run micrograph component 412, with each instance corresponding to a query.

Partition component 408 also generates, for each work unit, q different instances of reformat component 410, to reformat the data in the work unit prior to implementation of the micrograph. Following execution of the instances of run micrograph component 412 for each work unit, gather component 414 generates partial results for the work unit. For example, following execution of instances 506*a* . . . 506*p* of run micrograph component 412, gather component 414 generates partial results 510*a* for work unit 502*a*. Partial results 510*a* include the results of executing queries 1 . . . p against work unit 502*a*. Following execution of instances 508*a* . . . 508*p* of run micrograph component 412, gather component 414 generates partial results 510*q* for work unit 502*q*. Partial results 510*q* include the results of executing queries 1 . . . p against work unit 502*q*. Gather component 414 transmits partial results 510*a* . . . 510*q* to run micrograph component 416, which computes global sums for execution of each query against all the work units in the file.

The dataflow graphs (and micrographs) described herein are recoverable, e.g., from an error event. To ensure recoverability, a component (in the dataflow graph or micrograph) maintains a local state by checkpointing. The local state specifies a location in the stream of data processing has occurred, e.g., up to which point in the stream of data has processing occurred. The local state also specifies the results of processing up to that point. In an example, a file is arranged into a sequence of work units. That is, the data records included in a file are arranged into a sequence of work units. Each work unit has an assigned identifier (ID). As a dataflow graph starts processing the work units, one or more components of the dataflow graph store the IDs, to specify which of the work units have been processed. The component also performs checkpointing to store a result of performing an action (as specified by the component) on the work unit. This result is stored in association with the ID. The checkpointing effectively inserts a marker into the stream of data to specify which data in the stream has already been processed and results of processing that data. Because of this recoverability via checkpointing, if a dataflow graph crashes or otherwise encounters an error, the dataflow graph can recover by determining up to which unit it has already processed and continue processing on from that work unit, e.g., rather than having to starting processing the stream again.

In an example, system 102 maintains the file in on disk and/or in a memory cache (e.g., but does not store the file in a data repository). In this example, a query worker engine sends a message to a query driver that the query worker engine has finished processing a query object on the file. When the query driver receives this message from all the query worker engines that are processing the file, the file is archived and/or the file deleted from the cache and/or the disk. In this example, archival of the file does not result in the file being stored in a data repository.

Figure 6:
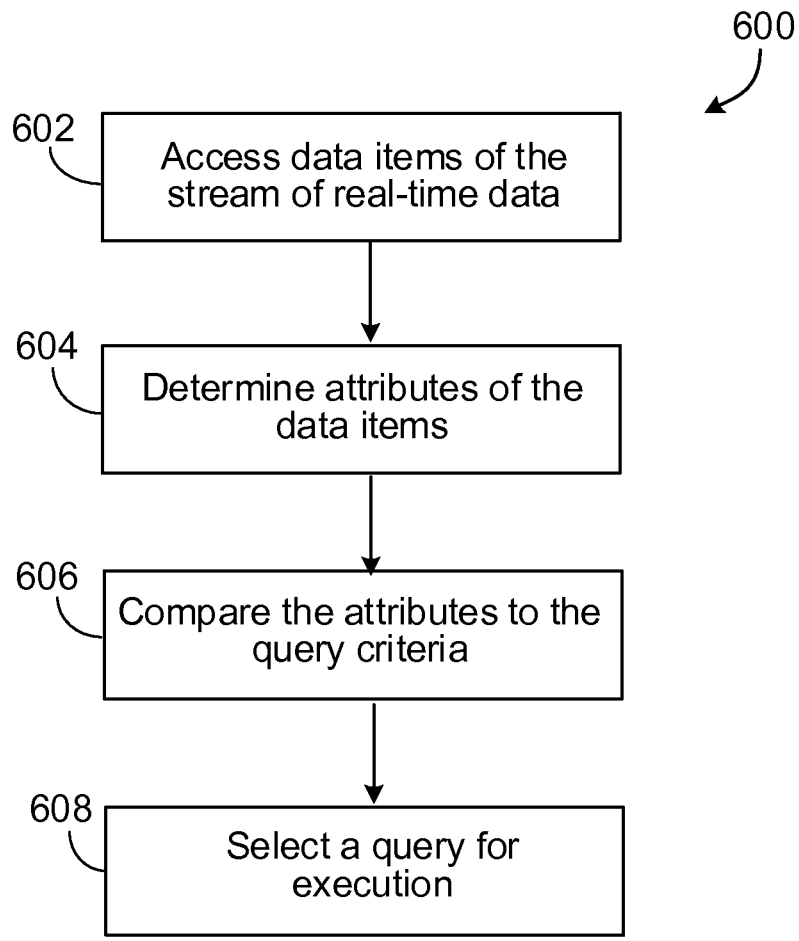
FIGS. 6-7 are flowcharts

Referring to FIG. 6, system 102 (or RTTT 103 on system 102) implements process 600 in selecting a query for execution on data items appearing at different times in a stream of real-time data. In operation, system 102 accesses (602) the data items of the stream, in real-time with respect to each of the data items. For example, system 102 accesses the data items by receiving the stream of real-time data from a data queue, a data repository (e.g., that is internal to system 102 or that is external to system 102), or a data feed (e.g., real-time data stream 104 in FIG. 1). In an example, system 102 access two or more data items in near real-time with respect to each of the two or more data items, with each of the two or more data items being located at different places in the stream, e.g., by one item of data occurring before another item of data in the stream.

System 102 determines (604) attributes of the data items, e.g., data types of the received data items, e.g., by analyzing contents of the data items. System 102 accesses, in a control repository, pre-defined queries that are candidates for execution on the stream of real-time data. System 102 compares (606) the attributes to query criteria for the various queries that are candidates for execution. Based on the comparison, system 102 selects (608) a query for execution on two or more of the data items that appear at different times and/or are located at different places in the stream. For example, system 102 selects a query with query criteria that are satisfied by one or more of the attributes of the data items. System 102 also selects the query at different times (and/or for data items appears in different portions of the stream), e.g., based on when data items that are relevant to the query are received.

In a variation, system 102 also selects, based on one or more attributes of the data items, another query for execution on two or more of the data items that appear at different times in the stream. System 102 executes both of these selected queries in real-time with respect to the data items of the stream. In still another variation, system 102 determines which of the queries to execute, by selecting the active query worker engines for that time, e.g., based on the user specified start time of the query. As previously described, a query worker engine is programmed to become active at the query start time. System 102 (or query driver) calls one instance of the query worker engine for every query to be executed for the current unit of work.

Figure 7:
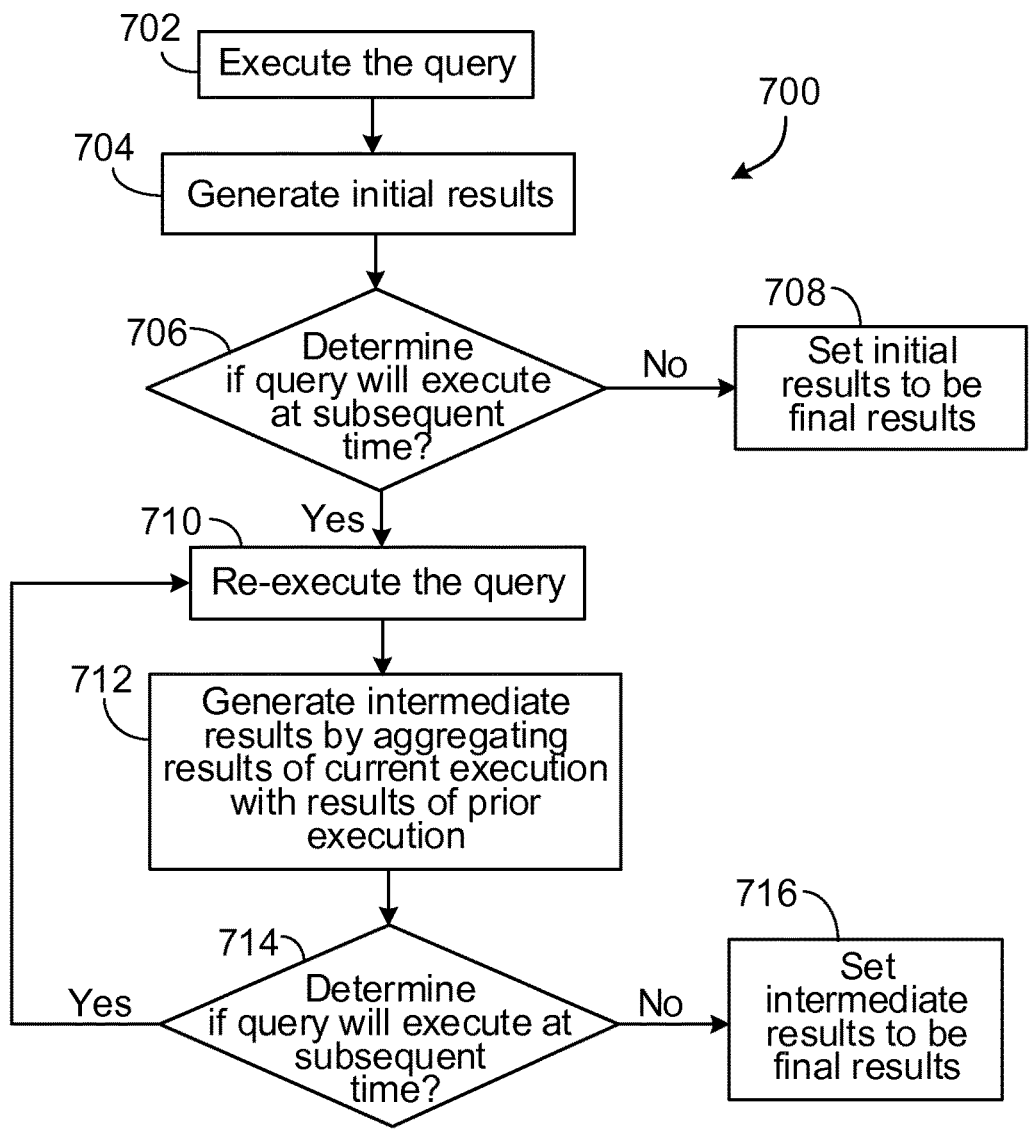

Referring to FIG. 7, system 102 (or RTTT 103 on system 102) implements process 700 in executing a query on data items appearing at different times in a stream of real-time data to provide near-real time intermediate results for the query, as the query continues to be executed (e.g., on subsequently appearing data items). In operation, system 102 executes (702), from time to time, the query on two or more of the data items that appear at different times in the stream. For example, system 102 executes the query on (i) first data items in the stream of real-time data, with the first data items being received at a first time, and (ii) second data items in the stream of real-time data, with the second data items being received at a second time.

System 102 executes the query by intermittently (or periodically) executing a dataflow graph that represents the query. In this example, the dataflow graph includes executable computer code to implement the query. Based on execution of the query, system 102 generates (704) initial results, e.g., information indicative of results of executing the query. System 102 determines (706) if the query will execute at a subsequent time. For example, system 102 makes this determination based on a query stop time in the query specification. If system 102 determines that the query will not execute at a subsequent time, system 102 sets (708) the initial results of the query execution to be final results. If system 102 determines that the query will execute at a subsequent time, system 102 re-executes (710) the query. Based on re-execution of the query, system 102 generates (712) intermediate results by aggregating the results of the re-execution with prior results (e.g., the initial results) of executing the query on data items that previously appeared in the stream of real-time data. In an example, as the query is being executed, system 102 generates the intermediate results, e.g., to later be aggregated with subsequent results. In this example, a user (e.g., a business analyst) may want to see and review the intermediate results, e.g., to determine which cards or transactions are at risk. In this example, system 102 transmits to a client device of the user the intermediate results of query execution, prior to completion of execution of the query.

System 102 determines (714) if the query will execute at a subsequent time. If system 102 determines that the query will not execute at a subsequent time, system 102 sets (716) the intermediate results of the query execution to be final results. If system 102 determines that the query will execute at a subsequent time, system 102 repeats actions 710, 712, 714, 716, as appropriate. Based on repeating these actions, system 102 aggregates (at a subsequent point in time) the intermediate results with results for executing the query at the subsequent point in time, e.g., to generate final results. In this example, system 102 stores the final results in a data repository and discards the intermediate results. Based on the final results (or the intermediate results), system 102 generates a real-time alert to alert a user of detection of a pre-defined condition.

Using the techniques described herein, RTTT executes concurrent queries on data items in a stream of real-time data, as the data is received and without accessing stored data from a database (which increases latency). By executing the queries in real-time as the data is received, RTTT generates real-time results (e.g., both intermediate and final) for query execution as the queries are executed. To receive results, a user does not need to wait for all the data to be received. Rather, the user can receive the results in real-time, as the queries are being executed.

Additionally, user-defined queries are run for a predefined monitoring period in the future. Data arrives continuously during the monitoring period and incoming data during the monitoring period is utilized in generating results. Rather than a traditional database process model of transient queries on static data, RTTT implements static queries on transient data. The queries are created by the users in advance and they are dormant in the system till the monitoring start time. The users use a simple interface to specify the query predicates such as attributes required, filtering, aggregation, sorting criteria, query control parameters like start/stop time, optional alerting conditions and a result recipient list. The queries 'listen' to the continuous data feed (e.g., message queues or messages on a port), 'wake up' at the monitoring start time, perform computations on data in the stream and sleep if/when there is no data in the stream. The intermediate results are available throughout the 'life' of the query and the final results are available immediately at the end time of the monitoring period for the query.

Figure 8:
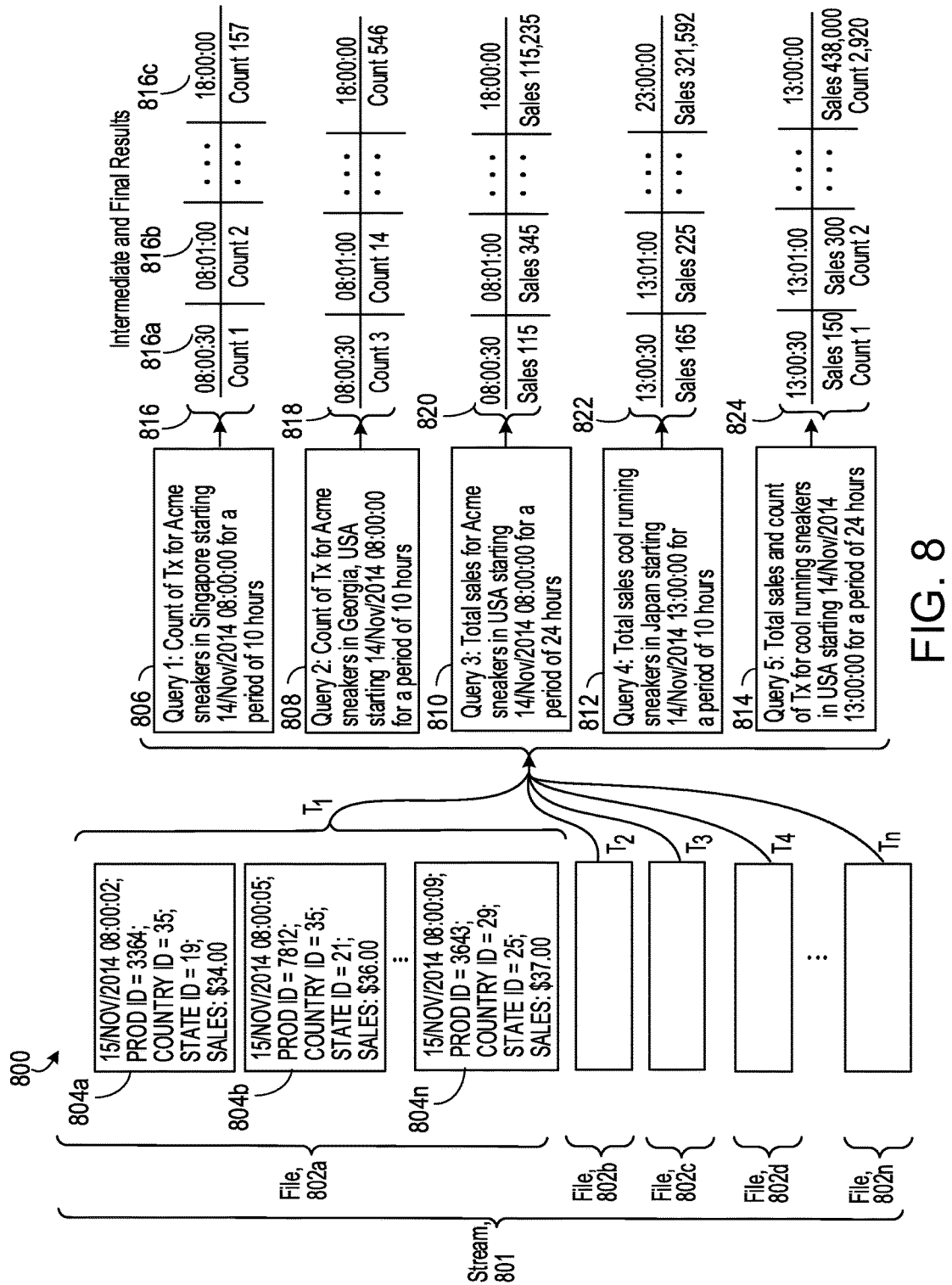

Referring to FIG. 8, diagram 800 conceptually displays the processing of data records in a file via five concurrent queries (e.g., that are executed via five different micrographs). In this example, RTTT 103 periodically receives files 802a . . . 802n (which, in turn, are included in real-time data stream 801). RTTT 103 receives files 802a . . . 802n at time intervals $T_1$ . . . $T_n$, respectively. In this example, each of files 802a . . . 802n are located at different places in stream 801. For example, file 802a is located in a place in stream 801 (e.g., a particular portion of stream 801) that comes before another place (e.g., portion) in stream 801 that includes file 802b. That is, one portion of stream 801 includes file 802a, another portion includes file 802b, and so forth. The illustrative example shown in FIG. 8 illustrates particular points in time in which queries 806, 808, 810, 812, 814 execute on files 802a . . . 802n. That is, files 802a . . . 802n represent files in stream 801 that are received during particular points in time (e.g., points in time in which queries 806, 808, 810, 812, 814 are simultaneously executing). In this example, queries 806, 808, 810, 812, 814 may also execute on other files (included in stream 801) that are not shown in FIG. 8, because one or more of queries 806, 808, 810, 812, 814 execute for different time intervals. In this example, results of execution against these other files may be used in determining the final results.

In this example, RTTT 103 receives file 802a at time 08:00:30, file 802b at time 08:01:00 and so forth. RTTT 102 receives a new file every thirty seconds. File 802 includes records 804a . . . 804n. In this example, there are 250,000 records in file 802. In this example, each record includes the following types of data: date (dd/mmm/yyyy), time (hh:mm:ss), a product identifier ("prod id."), a country identifier ("country id."), a state identifier ("state id.") and a sales amount. The other files (e.g., files 802b . . . 802n) also include individual data records.

In this example, a running shoe company has a business manager that wants to watch sales of sneakers (e.g., following release of new marketing campaign) and generates questions—dynamically in real time, such as what is the amount of uptick (e.g., increase) in sneaker sales, e.g., immediately after and during the marketing campaign.

In this example, the business manager uses RTTT 103 to create and execute queries 806, 808, 810, 812, 814 against files 802a . . . 802n. In this example, because queries 806, 808, 810, 812, 814 execute for different periods of time and/or start execution at different times, each of queries 806, 808, 810, 812, 814 may only process a portion of files 802a . . . 802n, depending on when the files are received and when the queries start and stop execution.

In this example, the running shoe company is launching two world-wide campaigns on two different running shoe brands, Acme sneakers and cool running sneakers. The campaign for Acme sneakers is launched at 08:00:00 (local time for each country in which the campaign is launched) on Nov. 14, 2014 (14/NOV/2014). The campaign for cool running sneakers is launched at 13:00:00 (local time for each country in which the campaign is launched) on Nov. 14, 2014 (14/NOV/2014). Each of queries 806, 808, 810, 812, 814 generally follows a format of "Show me the total sales and/or count of transaction for product X in country Y (or for a specific state in a country) for a period of N hours starting DD/MM/YYYY." In this example, query 806 is a query to count a number of transactions (Tx) for Acme sneakers sold Singapore starting 14/Nov/2014 08:00:00 for a period of 10 hours. Query 808 is a query to count a number of transactions (Tx) for Acme sneakers sold in Georgia, USA starting 14/Nov/2014 08:00:00 for a period of 10 hours. In this example, query 808 is a more granular that query 806, as query 808 is directed to metrics for a particular state, rather than an entire country. Query 810 is a query to count total sales for Acme sneakers sold in the USA starting 14/Nov/2014 08:00:00 for a period of 10 hours. Query 812 is a query to count total sales for cool running sneakers sold in the Japan starting 14/Nov/2014 13:00:00 for a period of 24 hours. Query 814 is a query to count total sales and number of transaction for cool running sneakers sold in the USA starting 14/Nov/2014 13:00:00 for a period of 24 hours.

Using the techniques described herein, RTTT 103 passes records (e.g., records 804a . . . 804n of file 802a and records in files 802b . . . 802n) through queries 806, 808, 810, 812, 814, concurrently and in near-real time, without storing the records to an electronic data warehouse. As queries 806, 808, 810, 812, 814 process records (e.g., 804a . . . 804n), RTTT 103 generates results 816, 818, 820, 822, 824, respectively, to provide live time results of query execution, as the queries are being processed. In this example, RTTT 103 processes approximately 500,000 records per minute and RTTT 103 receives multiple files per minute. In this example, RTTT 103 executes queries 806, 808, 810, 812, 814 continuously and processes files 802*a* . . . 802*n* in near real time as files 802*a* . . . 802*n* are received. For example, at time 08:00:00, queries 806, 808, 810, 812, 814 are executed against file 802*a*. At time 08:00:30, queries 806, 808, 810, 812, 814 are executed against file 802*b*, and so forth (e.g., in the event hat files are received every thirty seconds).

Based on execution of query 806, RTTT generates intermediate (incremental) results every time after it has processed new incoming data file (e.g., when the data is received as files periodically). In this example, intermediate results are produced as soon as the current set of input data is processed where there is a record matching the query condition. The files arrive every 30 seconds and the intermediate results are produced or updated at 08:00:30, 08:01:00 and so forth for queries 806, 808 and 810 which start at 08:00:00. In this example, at least one pair of Acme shoes are sold immediately in Singapore and Georgia at 8:00:00, when the first data file for these queries arrive. If not, the output will be produced anytime after 8 AM, when the first pairs are sold in these places.

In this example, RTTT 103 generates results 816 that display the number of transactions for Acme shoes in Singapore. In this example, results 816 include intermediate (e.g., partial) results 816*a*, 816*b* and final results 816*c*. As shown by intermediate results 816*a*, 816*b*, a first pair of Acme shoes are sold in Singapore between 08:00:00 and 08:00:30 and a second pair of Acme shoes are sold in Singapore between 08:00:30 and 08:01:00, respectively. In this example, the intermediate results are updated (in real-time), when RTTT detects a record matching the query criteria. In this example, the intermediate results 816*a*, 816*b* display the time at which the intermediate results are produced, e.g., at 08:00:30, 08:01:00 and so forth. In this example, the intermediate results display the time at which the transaction occurred (or the time at which the incremental or additional transaction occurred).

In this example, each of the displayed final results are aggregated results, from when the query started execution. For example, the final results 816*c* shown for 18:00:00 (e.g., 157,692 transactions) are a number of transactions from 08:00:00 to 18:00:00. In this example, the results shown at 18:00:00 are results of processing multiple files. Each of these results are provided live, in near real-time as the files are received by RTTT 103. Using the techniques described here, there is no data storage as queries operate on data, in real-time and as it is received. The queries are forward looking as they operate on data that will arrive in future and not historical data. Queries can be set to run for a duration ranging from seconds to weeks or months. RTTT also provides an ability for users to receive intermediate results during the monitoring period. The data is read once and distributed to query workers, which independently apply the individual query logic. For example, a system could include hundreds of query workers active in the system at a time. The latency of information delivered to the business is of the order of seconds.

Referring to FIG. 9, diagram 900 provides a visual illustration of dynamic execution of multiple queries over a twenty-four hour time period from 8 am, Nov. 14, 2015 to 8 am, Nov. 15, 2015. Queries 902, 904 are schedule for execution for 10 hours, starting at 8 am on Nov. 14, 2015. Query 906 is schedule for execution for twenty-four hours, also starting at 8 am on Nov. 14, 2015. At 8 am (or at a pre-specified time interval before 8 am), query driver 108 (FIG. 1) polls control repository 112 for active queries. Based on the polling, query driver 108 identifies queries 902, 904, 906 as scheduled for execution at 8 am and instantiates query worker engines to execute queries 902, 904, 906. Queries 902, 904, 906 are executed against near real-time data stream 911.

In this example, query 908 is scheduled for execution for ten hours, starting at 1 pm on Nov. 14, 2015 and ending at 11 pm on Nov. 14, 2015. Query 910 is scheduled for execution for twenty-four hours, starting at 1 pm on Nov. 14, 2015 and ending at 1 pm the next day (Nov. 15, 2014). During an intermittent polling of control repository 112, query driver 108 identifies queries 908, 910 as active queries for execution and causes queries 908, 910 to begin execution at 1 pm, while queries 902, 904, 906 are still executing. In this example, queries 908, 910 are dynamically added for execution, concurrent with other queries (i.e., queries 902, 904, 906) already being executed. At 6 pm, queries 902, 904 complete execution, as queries 906, 908, 910 continue with execution. At 11 pm, query 908 completes execution, as queries 906, 910 continue with execution. At 8 am the next day, query 906 completes execution, while query 910 still proceeds with its execution.

FIG. 9 also shows files 912*a* . . . 912*n*, 914*a* . . . 914*n*, 916*a* . . . 916*n*, 918*a* . . . 918*n*, which are files received by RTTT 103 in near real-time data stream 911 in a twenty-four hour time period (between 8 am, Nov. 14, 2014 and 8 am, Nov. 15, 2014). In this example, RTTT 103 receives files 912*a* . . . 912*n* from 8 am-1 pm, files 914*a* . . . 914*n* from 1 pm-6 pm, files 916*a* . . . 916*n* from 6 pm-11 pm and files 918*a* . . . 918*n* from 11 pm-8 am the next day. In this example, files included in near real-time data stream 911 are received by RTTT 103 at various time intervals, including, e.g., every thirty seconds. Appropriate queries are executed against files 912*a* . . . 912*n*, 914*a* . . . 914*n*, 916*a* . . . 916*n*, 918*a* . . . 918*n* (as each of the files is received) and intermediate (or final) results for these queries are updated based on processing files 912*a* . . . 912*n*, 914*a* . . . 914*n*, 916*a* . . . 916*n*, 918*a* . . . 918*n*. Queries 902, 904, 906, 908, 910 execute on different combinations of files 912*a* . . . 912*n*, 914*a* . . . 914*n*, 916*a* . . . 916*n*, 918*a* . . . 918*n*, depending on the start and stop times of the queries.

In this example, RTTT 103 receives files 912*a* . . . 912*n*, 914*a* . . . 914*n* between 8 am-6 pm. Queries 902, 904 process files 912*a* . . . 912*n*, 914*a* . . . 914*n*, in near real-time as each of files 912*a* . . . 912*n*, 914*a* . . . 914*n* is received, to generate intermediate and final results for execution of queries 902, 904.

RTTT 103 receives files 912*a* . . . 912*n*, 914*a* . . . 914*n*, 916*a* . . . 916*n*, 918*a* . . . 918*n* during the twenty-four hour time period between 8 am (Nov. 14, 2014)-8 am (Nov. 15, 2014). Query 906 processes files 912*a* . . . 912*n*, 914*a* . . . 914*n*, 916*a* . . . 916*n*, 918*a* . . . 918*n*, in near real-time as each of files 912*a* . . . 912*n*, 914*a* . . . 914*n*, 916*a* . . . 916*n*, 918*a* . . . 918*n* is received, to generate intermediate and final results for execution of query 906. RTTT 103 receives files 914*a* . . . 914*n*, 916*a* . . . 916*n* during the ten hour time period between 1 pm-11 pm. Query 908 processes files 914*a* . . . 914*n*, 916*a* . . . 916*n*, in near real-time as each of files 914*a* . . . 914*n*, 916*a* . . . 916*n* is received, to generate intermediate and final results for execution of query 908. RTTT 103 receives files 914*a* . . . 914*n*, 916*a* . . . 916*n*, 918*a* . . . 918*n* during 1 pm-8 am the next day. Query 910 is scheduled to run for twenty-four hours starting at 1 pm on Nov. 14, 2014. Query 910 processes files 914*a* . . . 914*n*, 916*a* . . . 916*n*, 918*a* . . . 918*n*, in near real-time as each of files 914*a* . . . 914*n*, 916*a* . . . 916*n*, 918*a* . . . 918*n* is received, to generate intermediate results for execution of query 910. Query 910 continues processing other files (which are not shown) received after 8 am (on Nov. 15, 2015) until completion of query 910.

The techniques described above can be implemented using software for execution on a computer. For instance, the software forms procedures in one or more computer programs that execute on one or more programmed or programmable computer systems (which can be of various architectures such as distributed, client/server, or grid) each including at least one processor, at least one data storage system (including volatile and non-volatile memory and/or storage elements), at least one input device or port, and at least one output device or port. The software can form one or more modules of a larger program, for example, that provides other services related to the design and configuration of dataflow graphs. The nodes and elements of the graph can be implemented as data structures stored in a computer readable medium or other organized data conforming to a data model stored in a data repository.

The software can be provided on a storage medium and/or a hardware storage device, such as a CD-ROM, readable by a general or special purpose programmable computer, or delivered (encoded in a propagated signal) over a communication medium of a network to a storage medium of the computer where it is executed. All of the functions can be performed on a special purpose computer, or using special-purpose hardware, such as coprocessors. The software can be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system can also be considered to be implemented as a computer-readable storage medium, configured with a computer program, where the storage medium so configured causes a computer system to operate in a specific and predefined manner to perform the functions described herein.

A number of embodiments of the invention have been described. Nevertheless, it will be understood that various modifications can be made without departing from the spirit and scope of the invention. For example, some of the steps described above can be order independent, and thus can be performed in an order different from that described.

It is to be understood that the foregoing description is intended to illustrate and not to limit the scope of the invention, which is defined by the scope of the appended claims. For example, a number of the function steps described above can be performed in a different order without substantially affecting overall processing. Other embodiments are within the scope of the following claims.

What is claimed is:

1. A computer-implemented method for executing a dataflow graph that represents a query on data items in a stream of near real-time data to provide, as the dataflow graph is being executed, intermediate results for the query, the method including:

receiving a stream of near real-time data having data items located in different places in the stream;

between a first time and a second time, intermittently executing the dataflow graph that represents the query multiple times, with the dataflow graph being executed by one or more computer systems in near real-time with respect to receipt of the stream of near real-time data and being executed upon the stream of near real-time data for two or more of the data items, with the dataflow graph including computer code to implement the query, and with the dataflow graph receiving as input query specifications for the query;

generating, during execution of the dataflow graph, one or more query results that satisfy the query;

generating intermediate results from the one or more query results, as the dataflow graph intermittently executes between the first time and the second time, by aggregating the one or more query results with one or more prior query results of one or more prior executions of the dataflow graph on the stream of near real-time data for the two or more of the data items that previously appeared in the stream of near real-time data; and transmitting to one or more client devices the intermediate results during intermittent execution of the dataflow graph, prior to completion of execution of the dataflow graph.

2. A system for executing a dataflow graph that represents a query on data items in a stream of near real-time data to provide, as the dataflow graph is being executed, intermediate results for the query, the system including:

one or more processing devices; and one or more machine-readable hardware storage devices storing instructions that are executable by the one or more processing devices to perform operations including:

receiving a stream of near real-time data having data items located in different places in the stream;

between a first time and a second time, intermittently executing the dataflow graph that represents the query multiple times, with the dataflow graph being executed by one or more computer systems in near real-time with respect to receipt of the stream of near real-time data and being executed upon the stream of near real-time data for two or more of the data items, with the dataflow graph including computer code to implement the query, and with the dataflow graph receiving as input query specifications for the query;

generating, during execution of the dataflow graph, one or more query results that satisfy the query;

generating intermediate results from the one or more query results, as the dataflow graph intermittently executes between the first time and the second time, by aggregating the one or more results with one or more prior query results of one or more prior executions of the query dataflow graph on the stream of near real-time data for the two or more of the data items that previously appeared in the stream of near real-time data; and transmitting to one or more client devices the intermediate results during intermittent execution of the dataflow graph, prior to completion of execution of the dataflow graph.

3. One or more machine-readable hardware storages for executing a dataflow graph that represents a query on data items in a stream of near real-time data to provide, as the dataflow graph is being executed, intermediate results for the query, the one or more machine-readable hardware storages storing instructions that are executable by one or more processing devices to perform operations including:
- receiving a stream of near real-time data having data items located in different places in the stream;
- between a first time and a second time, intermittently executing the dataflow graph that represents the query multiple times, with the dataflow graph being executed by one or more computer systems in near real-time with respect to receipt of the stream of near real-time data and being executed upon the stream of near real-time data for two or more of the data items, with the dataflow graph including computer code to implement the query, and with the dataflow graph receiving as input query specifications for the query;
- generating, during execution of the dataflow graph, one or more query results that satisfy the query;
- generating intermediate results from the one or more query results, as the dataflow graph intermittently executes between the first time and the second time, by aggregating the one or more query results with one or more prior query results of one or more prior executions of the dataflow graph on the stream of near real-time data for the two or more of the data items that previously appeared in the stream of near real-time data; and
- transmitting to one or more client devices the intermediate results during intermittent execution of the dataflow graph, prior to completion of execution of the dataflow graph.

4. The computer-implemented method of claim 1, further including:
at a subsequent point in time, aggregating the intermediate results with results for executing the dataflow graph at the subsequent point in time to generate final results.

5. The computer-implemented method of claim 1, wherein intermittently executing the dataflow graph includes:
executing the dataflow graph on a first one of the data items in the stream of near real-time data located in a first portion of the stream of near real-time data, and
executing the dataflow graph on a second one of the data items in the stream of near real-time data located in a second portion of the stream.

6. The computer-implemented method of claim 1, wherein the dataflow graph includes components that represent operations to be performed in execution of the query, and wherein the method further includes:
for a component:
performing a checkpoint operation that saves a local state of the component to enable recoverability of a state of the dataflow graph.

7. The computer-implemented method of claim 1, wherein the dataflow graph is executed on data items that appear in the stream of near real-time data during a period of time the end of which is unknown at a start of executing the dataflow graph.

8. The computer-implemented method of claim 1, wherein an amount of data items in the stream of near real-time data on which the dataflow graph is executed is unknown at a start of executing the dataflow graph.

9. The computer-implemented method of claim 1, further including:
generating, based on the aggregated results, a near real-time alert to alert a user of detection of a pre-defined condition.

10. The computer-implemented method of claim 1, wherein the stream of near real-time data includes a stream of near real-time data in which data items are (i) periodically received at different times or (ii) continuously received at different times.

11. The computer-implemented method of claim 1, further including receiving the stream of near real-time data from a data queue, a data repository, or a data feed.

12. The computer-implemented method of claim 1, wherein the dataflow graph is a first dataflow graph, with the method further including:
selecting a second dataflow graph for execution on two or more of the data items that appear at different locations in the stream of near real-time data; and
executing the first and second dataflow graphs in near real-time with respect to the data items of the stream of near real-time data.

13. The computer-implemented method of claim 1, further including:
generating information for a user interface that when rendered on a display device includes:
input fields for input of information defining dataflow graphs to be executed on the stream of data.

14. The computer-implemented method of claim 1, further including:
accessing, in a control repository, pre-defined dataflow graphs that are candidates for execution on the stream of near real-time data.

15. The system of claim 2, wherein the operations further include:
at a subsequent point in time, aggregating the intermediate results with results for executing the dataflow graph at the subsequent point in time to generate final results.

16. The system of claim 2, wherein intermittently executing the dataflow graph includes:
executing the dataflow graph on a first one of the data items in the stream of near real-time data located in a first portion of the stream of near real-time data, and
executing the dataflow graph on a second one of the data items in the stream of near real-time data located in a second portion of the stream.

17. The system of claim 2, wherein the dataflow graph includes components that represent operations to be performed in execution of the query, and wherein the operations further include:
for a component:
performing a checkpoint operation that saves a local state of the component to enable recoverability of a state of the dataflow graph.

18. The system of claim 2, wherein the dataflow graph is executed on data items that appear in the stream of near real-time data during a period of time the end of which is unknown at a start of executing the dataflow graph.

19. The system of claim 2, wherein an amount of data items in the stream of near real-time data on which the dataflow graph is executed is unknown at a start of executing the dataflow graph.

20. The computer-implemented method of claim 4, further including:
storing the final results and discarding the intermediate results.

21. The computer-implemented method of claim 7, further including:
accessing information indicative of user-defined custom operations for data transformation on the aggregated results;

executing the user-defined custom operations on the aggregated results; and transforming the aggregated results in accordance with the user-defined custom operations.

22. The system of claim 15, wherein the operations further include:

storing the final results and discarding the intermediate results.

* * * * *

UNITED STATES PATENT AND TRADEMARK OFFICE
CERTIFICATE OF CORRECTION

PATENT NO. : 10,657,134 B2
APPLICATION NO. : 14/818895
DATED : May 19, 2020
INVENTOR(S) : Rajesh Gadodia and Joseph Skeffington Wholey, III Page 1 of 1

It is certified that error appears in the above-identified patent and that said Letters Patent is hereby corrected as shown below:

In the Claims

Column 24, Line 54, Claim 2, after "more", insert -- query --

Signed and Sealed this
Fourteenth Day of July, 2020

Andrei Iancu
*Director of the United States Patent and Trademark Office*